(12) United States Patent
Ueda et al.

(10) Patent No.: US 7,826,620 B2
(45) Date of Patent: Nov. 2, 2010

(54) INFORMATION PROCESSOR, INFORMATION PROCESSING METHOD, AND COMPUTER PROGRAM

(75) Inventors: Kenjiro Ueda, Kanagawa (JP); Tateo Oishi, Saitama (JP); Katsumi Muramatsu, Tokyo (JP); Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 1116 days.

(21) Appl. No.: 11/397,809

(22) Filed: Apr. 5, 2006

(65) Prior Publication Data

US 2006/0227975 A1 Oct. 12, 2006

(30) Foreign Application Priority Data

Apr. 11, 2005 (JP) ............................. 2005-113035

(51) Int. Cl.
  H04L 9/08 (2006.01)
(52) U.S. Cl. ...................... 380/281; 380/279; 380/278
(58) Field of Classification Search .............. 380/281, 380/278, 279; 707/9
  See application file for complete search history.

(56) References Cited

U.S. PATENT DOCUMENTS 6,683,954 B1 * 1/2004 Searle ........................ 380/281

OTHER PUBLICATIONS

TurboCrypt Disk Encryption 6.58 Ranking & Summary as posted on http://wareseeker.com/, posting been added in Feb. 16, 2004; date: Feb. 16, 2004.*

An Efficient Time-Bound Hierarchical Key Management Scheme for Secure Broadcasting; Bertino, E.; Ning Shang; Wagstaff, S.S.; Dependable and Secure Computing, IEEE Transactions on; vol. 5, Issue: 2 Publication Year: 2008 , pp. 65-70.*

Optimal Communication Complexity of Generic Multicast Key Distribution; Micciancio, D.; Panjwani, S.; Networking, IEEE/ACM Transactions on; vol. 16, Issue: 4 Publication Year: 2008, pp. 803-813.*

Key management for restricted multicast using broadcast encryption; Abdalla, M.; Shavitt, Y.; Wool, A.; Networking, IEEE/ACM Transactions on; vol. 8, Issue: 4 Publication Year: 2000 , pp. 443-454.*

U.S. Appl. No. 12/211,373, filed Sep. 16, 2008, Ueda, et al.
U.S. Appl. No. 12/234,075, filed Sep. 19, 2008, Ueda, et al.
U.S. Appl. No. 12/486,173, filed Jun. 17, 2009, Ueda, et al.

* cited by examiner

*Primary Examiner*—David Y Jung
(74) *Attorney, Agent, or Firm*—Oblon, Spivak, McClelland, Maier & Neustadt, L.L.P.

(57) ABSTRACT

An information processor includes a data processing section that executes a processing of storing subsequently generated data, which is subsequently generated or acquired using information read from an information recording medium, onto a storage unit. The data processing section is configured to execute a processing of storing onto the storage unit encrypted subsequently generated data as encrypted data that is encrypted with a unit key as an encryption key corresponding to a content management unit to which the subsequently generated data belongs, and execute a processing of acquiring an encrypted bind unit key and storing the encrypted bind unit key onto the storage unit, the encrypted bind unit key being encrypted data of a bind unit key including as its constituent data the unit key and one of key information acquired from the information processor and identification information acquired from the information recording medium.

10 Claims, 21 Drawing Sheets

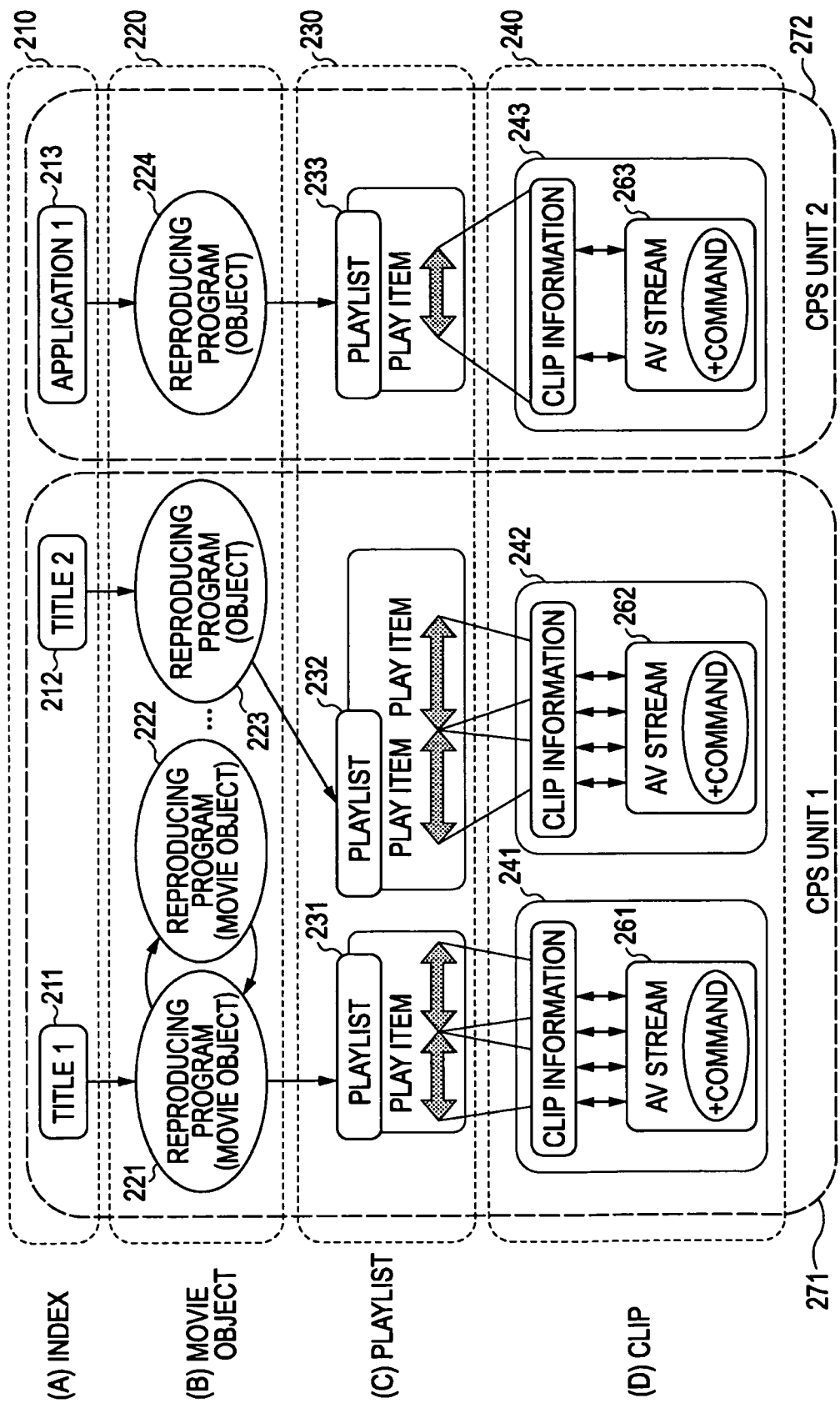

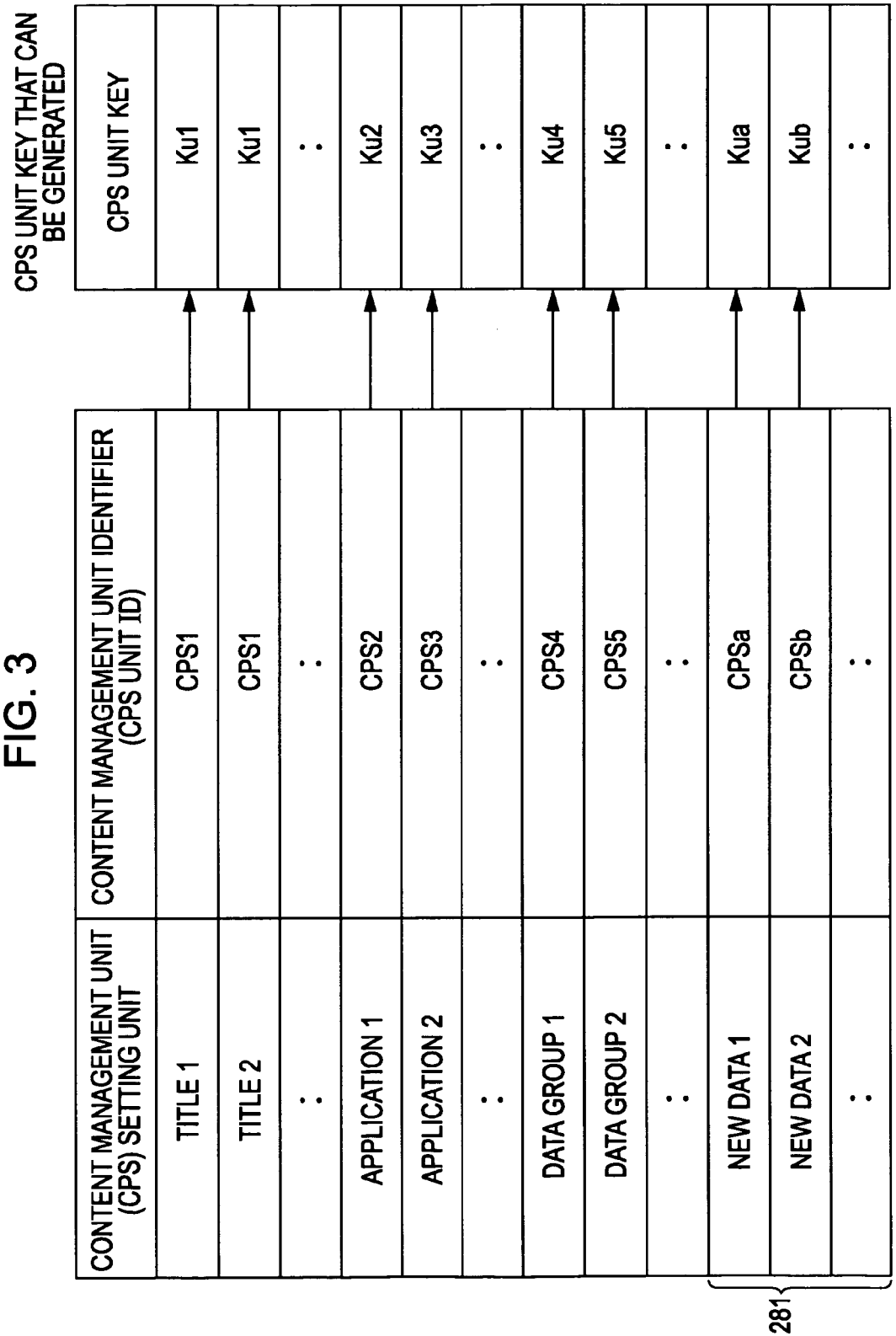

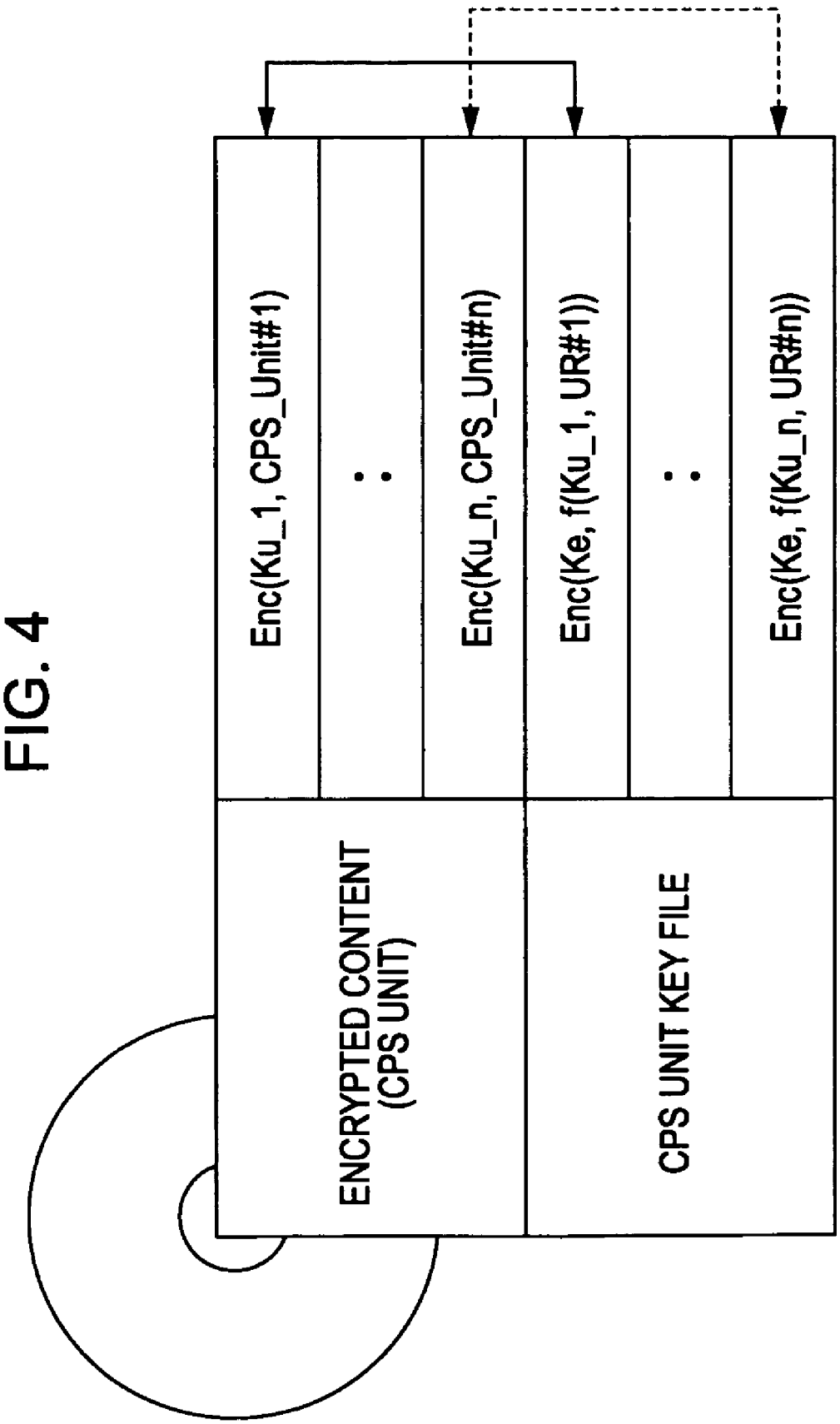

FIG. 5A (EXAMPLE OF CODE VALUE OF BINDING TYPE: 8bit)

| CODE | BINDING TYPE |
|---|---|
| 01h | DEVICE-BINDING |
| 02h | DISC SERIAL-BINDING |
| 03h | PACKAGE-BINDING |
| 04h | UNBOUNDED |
| 05-FFh | reserved for private use |

FIG. 5Ba

CASE WHERE DESIGNATION IS MADE ON PER-CPS UNIT BASIS FOR WRITING TO Usage Rule (XML EXPRESSION)

```
<cci_info type="BindingInfo">
  <cci_value type="Binding" data="01"/>
</cci_info>
```

FIG. 5Bb

CASE WHERE DESIGNATION IS MADE ON PER-CPS UNIT BASIS FOR WRITING TO Usage Rule (BINARY EXPRESSION)

```
CCI_Info Binding(){
  Binding type      8bits
  reserved          8bits
}
```

FIG. 5Bc

CASE WHERE DESIGNATION IS MADE ON A FILE-BY-FILE BASIS FOR WRITING TO FILE OTHER THAN Usage Rule OR ACCESS PERMISSION/RESTRICTION INFORMATION

[File Name]                         [Binding Type]
BDMV/AUXDATA/sound.bdmv    "02"    (SOUND EFFECT FILE)
BDMV/STREAM/00001.m2ts      "01"    (AV STREAM)
BDMV/AUXDATA/01000.otf       "03"    (CHARACTER FONT FILE)
BDMV/AUXDATA/studio1.dat    "0F"    (DATA UNITQUE TO STUDIO)

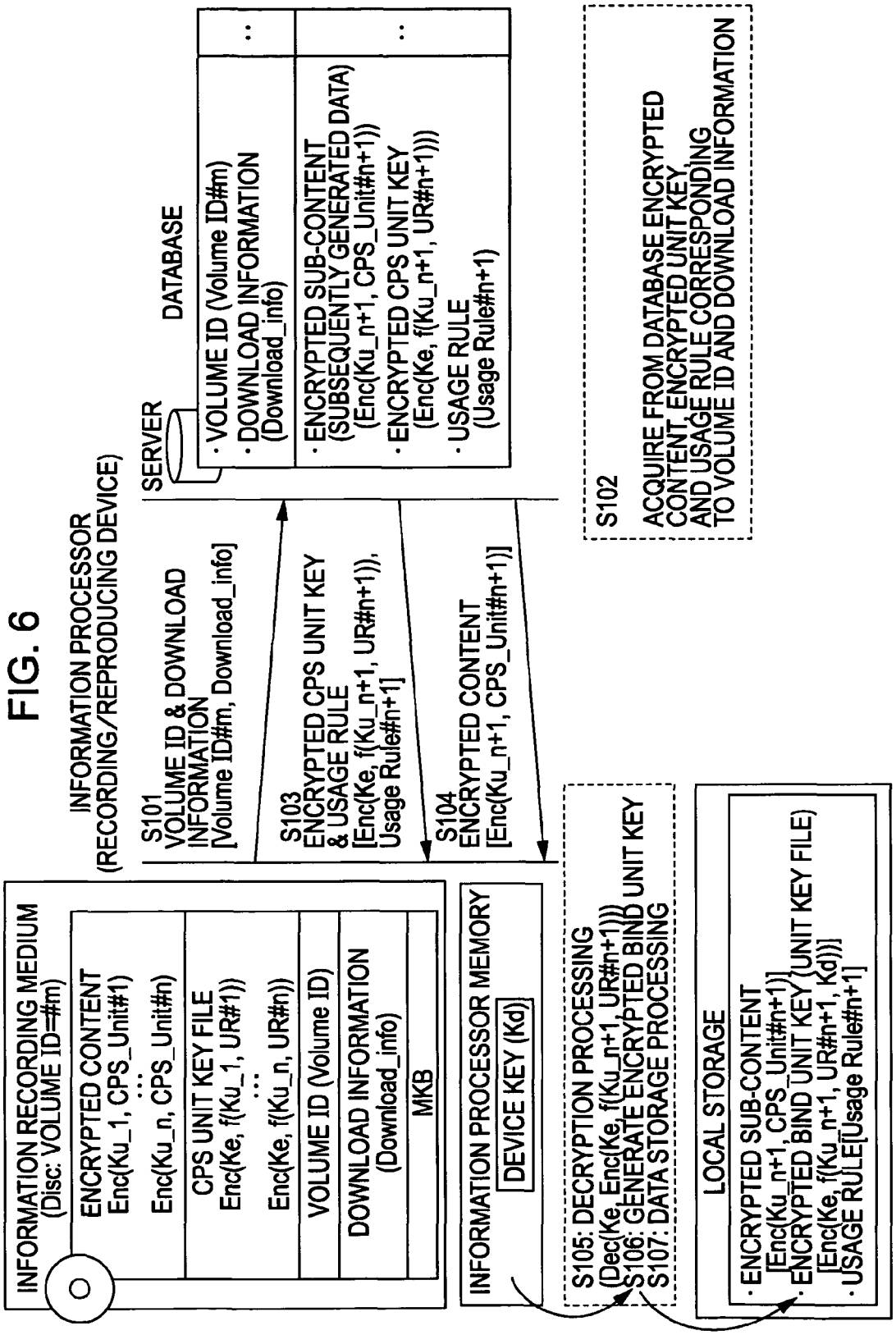

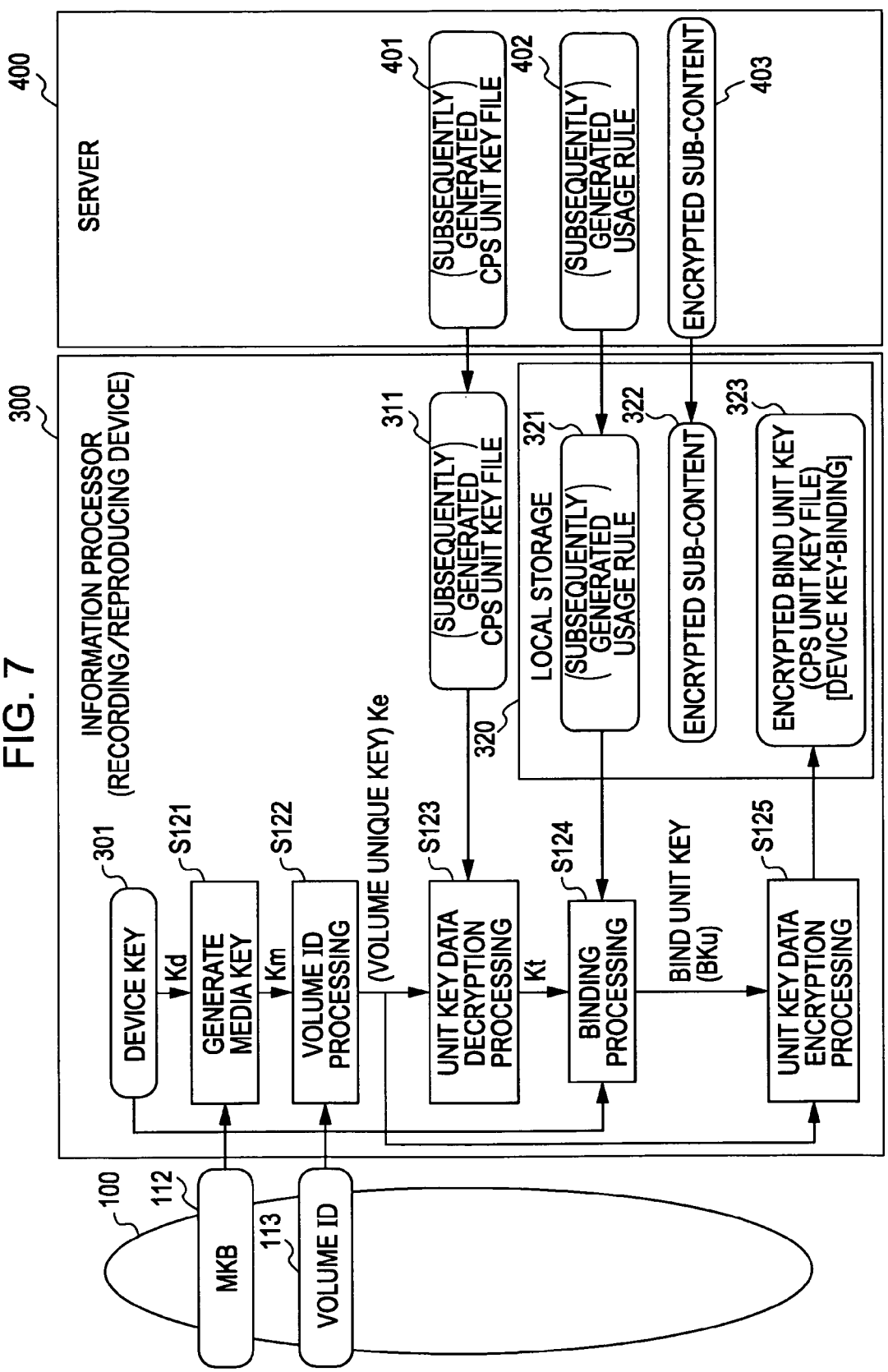

INFORMATION PROCESSOR, INFORMATION PROCESSING METHOD, AND COMPUTER PROGRAM

CROSS REFERENCES TO RELATED APPLICATIONS

The present invention contains subject matter related to Japanese Patent Application JP 2005-113035 filed in the Japanese Patent Office on Apr. 11, 2005, the entire contents of which are incorporated herein by reference.

BACKGROUND OF THE INVENTION

1. Field of the Invention

The present invention relates to an information processor, an information processing method, and a computer program. More specifically, the present invention relates to an information processor, an information processing method, and a computer program, which realize usage control on a per-unit basis with respect to content stored on an information recording medium, and achieve strict usage control with respect to subsequently generated data such as data subsequently generated or downloaded by the user.

2. Description of the Related Art

Various software data, including audio data such as music, image data such as a movie, game programs, various application programs, and the like (hereinafter, these are referred to as "content") can be stored as digital data onto a recording medium, for example, a Blu-ray Disc (trademark) using blue laser, a DVD (Digital Versatile Disc), an MD (Mini Disc), or a CD (Compact Disc). In particular, the Blu-ray Disc (trademark) using blue laser is a disc capable of high-density recording, which can record large-volume video content in the form of high image quality data.

Digital content is stored on various kinds of these information recording media (recording media) to be provided to the user. The user reproduces or uses the content using a reproducing device such as a PC (Personal Computer) or disc player the user owns.

For many kinds of content such as music data, image data, or the like, the distribution right or the like for the content is generally owned by the creator or seller of the content. Accordingly, the distribution of these kinds of content is generally subject to certain usage restrictions, that is, unauthorized duplication or the like is prevented by permitting only authorized users to use the content.

Digital recorders or recording media enable repeated recording and reproduction without causing, for example, a degradation of the image or sound quality. This has led to the problem that delivery of unauthorized copied contents over the Internet, circulation of so-called pirated discs produced by copying content onto a CD-R or the like, and use of copied content stored on a hard disk of a PC or the like are rampant.

A DVD, or a mass storage recording medium such as a recording medium using blue laser whose development has progressed in recent years allows a large volume of data equivalent to, for example, one to several tens of movies to be recorded on a single medium in the form of digital information. As it becomes possible to record video information and the like as digital information in this manner, it is becoming increasingly important to prevent unauthorized copying to protect the rights of copyright owners. In these days, in order to prevent such unauthorized copying of digital data, various technologies for preventing illegal copying have been implemented for digital recorders and recording media.

For example, Content Scramble System is adopted for DVD players. According to the Content Scramble System, video data, audio date, or the like is recorded on a DVD-ROM (Read Only Memory) in an encrypted form. A key used to decrypt the encrypted data is given to a licensed DVD player. The license is given to a DVD player designed to comply with predetermined operation requirements such as not to perform unauthorized copying. Accordingly, on the licensed DVD player, images or sound can be reproduced from a DVD-ROM by decrypting the encrypted data recorded on the DVD-ROM using the given key.

On the other hand, a DVD player that has not received the license cannot perform decryption of the encrypted data recorded on the DVD-ROM because it does not have the key necessary for decrypting the encrypted data. In this way, with the Content Scramble System, reproduction of data on a DVD-ROM recording digital data cannot be performed with a DVD player that does not satisfy the conditions required at the time of licensing, thereby preventing unauthorized copying.

SUMMARY OF THE INVENTION

The management system for content stored on an information recording medium is constructed as described above. Further, for example, a system enabling the user to readily download content such as sound effects, moving and still pictures, and the like as the materials for video works, is disclosed in Japanese Patent Application Publication No. 2003-140662. Further, in Japanese Patent Application Publication No. 2002-311967, there is disclosed a technique enabling data corresponding to a part of the entire music data to be replaced by another data. However, it is hard to say that secure data management or usage management is realized for subsequently generated data, such as data generated by the user executing a program as the content stored on an information recording medium, or data or content acquired from an external server.

In particular, in environments where various application programs can be executed, such as in a PC environment, in many cases, a directory to be managed by a general-purpose file system is set, which means that subsequently generated data, which is data subsequently generated or acquired by the user, can be accessed by various applications. Accordingly, even subsequently generated data that is to be managed by the content management system is required to be set in the directory managed by such a general-purpose file system. Accordingly, unless special settings are made, access is made from various application programs, which disadvantageously allows unauthorized use or alteration of data to be made.

Further, there are various kinds of subsequently generated data, including subsequently generated data used in correspondence with content stored on a specific information recording medium subsequently generated data that can be commonly used in correspondence with content provided by a specific studio as a content providing entity providing the content, and subsequently generated data that can be commonly used in correspondence with contents provided by different studios. It is desired to perform usage control in accordance with these respective kinds of subsequently generated data. However, with conventional systems, it is difficult to perform such usage control in accordance with the kind of subsequently generated data.

Accordingly, it is desirable to provide an information processor, an information processing method, and a computer program, which realize, with respect to subsequently generated data, such as data acquired from the external or generated by the user in correspondence with content stored on an information recording medium, the same usage control as that performed on the content stored on the information recording medium, and which further make it possible to perform usage control in accordance with various kinds of subsequently generated data.

According to a first aspect of the present invention, there is provided an information processor, including: a data processing section that executes a processing of storing subsequently generated data, which is subsequently generated or acquired using information read from an information recording medium, onto storage means, wherein the data processing section is configured to execute a processing of storing onto the storage means encrypted subsequently generated data as encrypted data that is encrypted with a unit key as an encryption key corresponding to a content management unit to which the subsequently generated data belongs, and execute a processing of acquiring an encrypted bind unit key and storing the encrypted bind unit key onto the storage means, the encrypted bind unit key being encrypted data of a bind unit key including as its constituent data the unit key and one of key information acquired from the information processor and identification information acquired from the information recording medium.

Further, in the information processor according to an embodiment of the present invention, the data processing section is configured to execute a processing of acquiring an encrypted bind unit key and storing the encrypted bind unit key onto the storage means, the encrypted bind unit key including in the bind unit key usage rules corresponding to the content management unit to which the subsequently generated data belongs.

Further, in the information processor according to an embodiment of the present invention, the data processing section is configured to generate a device key unique to the information processor and stored in the information processor, and an encrypted bind unit key as encrypted data of a bind unit key including the unit key as its constituent data.

Further, in the information processor according to an embodiment of the present invention, the data processing section is configured to generate identification information unique to the information recording medium and stored on the information recording medium, and an encrypted bind unit key as encrypted data of a bind unit key including the unit key as its constituent data.

Further, in the information processor according to an embodiment of the present invention, the data processing section is configured to generate identification information stored on the information recording medium and unique to an assembly of a predetermined number of information recording media, and an encrypted bind unit key as encrypted data of a bind unit key including the unit key as its constituent data.

Further, in the information processor according to an embodiment of the present invention, the data processing section is configured to generate a bind unit key by computation processing based on the unit key and one of key information acquired from the information processor and identification information acquired from the information recording medium.

Further, in the information processor according to an embodiment of the present invention, the computation processing is an exclusive OR operation.

Further, in the information processor according to an embodiment of the present invention, the information processor is configured to store subsequently generated data acquired from a subsequently generated data providing server onto the storage means, and acquire the encrypted bind unit key by decrypting an encrypted unit key corresponding to acquired subsequently generated data acquired from one of the subsequently generated data providing server and a server different from the subsequently generated data providing server.

Further, according to a second aspect of the present invention, there is provided an information processor, including: a data processing section that executes decryption processing of encrypted content, wherein: the data processing section is configured to execute a processing of acquiring an encrypted bind unit key from storage means, the encrypted bind unit key being encrypted data including a unit key used to encrypt the encrypted content, decrypting the acquired encrypted bind unit key, and calculating the unit key through unbinding processing; and the unbinding processing with respect to the encrypted bind unit key is performed as data processing to which one of key information acquired from the information processor and identification information acquired from an information recording medium is applied.

Further, in the information processor according to an embodiment of the present invention, the bind unit key includes as its constituent data usage rules corresponding to a content management unit to which the subsequently generated data belongs; and the data processing section is configured to perform, as the unbinding processing, data processing to which one of key information acquired from the information processor and identification information acquired from an information recording medium, and the usage rules are applied.

Further, in the information processor according to an embodiment of the present invention, the data processing section is configured to acquire the binding type of the subsequently generated data from usage rules corresponding to the subsequently generated data or from another data file, and determine data to be applied to execution of the unbinding processing in accordance with the acquired information.

Further, according to a third aspect of the present invention, there is provided an information processing method, including: a data processing step of executing a processing of storing subsequently generated data, which is subsequently generated or acquired using information read from an information recording medium, onto storage means, wherein the data processing step includes: a step of storing onto the storage means encrypted subsequently generated data as encrypted data that is encrypted with a unit key as an encryption key corresponding to a content management unit to which the subsequently generated data belongs; an encrypted bind unit key acquiring step of acquiring an encrypted bind unit key, the encrypted bind unit key being encrypted data of a bind unit key including as its constituent data the unit key and one of key information acquired from an information processor and identification information acquired from the information recording medium; and a step of executing a processing of storing the encrypted bind unit key onto the storage means.

Further, according to a fourth aspect of the present invention, there is provided an information processing method, including: a data processing step of executing decryption processing of encrypted content, wherein the data processing step includes: a step of acquiring an encrypted bind unit key from storage means, the encrypted bind unit key being encrypted data including a unit key used to encrypt the encrypted content; a decrypting step of executing decryption processing of the acquired encrypted bind unit key; and an unbinding processing step of calculating the unit key through unbinding processing, and wherein the unbinding processing step is performed as data processing to which one of key information acquired from an information processor and identification information acquired from an information recording medium is applied.

Further, according to a fifth aspect of the present invention, there is provided a computer program for executing information processing on a computer, including: a data processing step of executing a processing of storing subsequently generated data, which is subsequently generated or acquired using information read from an information recording medium, onto storage means, wherein the data processing step includes: a step of storing onto the storage means encrypted subsequently generated data as encrypted data that is encrypted with a unit key as an encryption key corresponding to a content management unit to which the subsequently generated data belongs; an encrypted bind unit key acquiring step of acquiring an encrypted bind unit key, the encrypted bind unit key being encrypted data of a bind unit key including as its constituent data the unit key and one of key information acquired from an information processor and identification information acquired from the information recording medium; and a step of executing a processing of storing the encrypted bind unit key onto the storage means.

Further, according to a sixth aspect of the present invention, there is provided a computer program for executing information processing on a computer, including: a data processing step of executing decryption processing of encrypted content, wherein the data processing step includes: a step of acquiring an encrypted bind unit key from storage means, the encrypted bind unit key being encrypted data including a unit key used to encrypt the encrypted content; a decrypting step of executing decryption processing of the acquired encrypted bind unit key; and an unbinding processing step of calculating the unit key through unbinding processing, and wherein the unbinding processing step is performed as data processing to which one of key information acquired from an information processor and identification information acquired from an information recording medium is applied.

Note that the computer program according to an embodiment of the present invention is, for example, a computer program that can be provided to a computer system that can execute various program codes by means of a recording medium provided in a computer-readable format, including a recording medium such as a DVD, a CD, an MO, or by means of a communication medium such as a network. By providing such a program in a computer-readable format, processing in accordance with the program is realized on the computer system.

The above and other objects, features, and advantages of the present invention will become apparent from the following detailed description based on embodiments of the present invention that will be described later and the accompanying drawings. Note that the term "system" as used in this specification refers to a logical assembly structure of a plurality of devices, and devices of each structure are not necessarily present within the same casing.

According to an embodiment of the present invention, when recording subsequently generated data, such as information subsequently generated by the user using the information stored on the information recording medium or downloaded information, onto the local storage such as a hard disk or a removable medium, the unit key as the encryption key for the subsequently generated data is generated as data bound to the key information acquired from the information processor or the identification information acquired from the information recording medium, and is recoded in an encrypted form. Thus, unbinding processing is required to use the subsequently generated data recorded on the local storage. The unbinding processing requires the following conditions. That is, in the case of, for example, device-binding type subsequently generated data, it is required that the information processor that is to use the subsequently generated data be the same information processor that has executed the recording; in the case of, for example, disc-binding type subsequently generated data, it is required that the same disc as that used when recording the subsequently generated data be loaded in the information processor; and in the case of, for example, package-binding type subsequently generated data, it is required that the information processor be loaded with a disc having the same package ID as that of the disc used when recording the subsequently generated data. Therefore, usage restrictions for subsequently generated data can be realized in various ways.

BRIEF DESCRIPTION OF THE DRAWINGS

FIG. 2 is a diagram illustrating an example of setting of content management units set with respect to content stored on the information recording medium;

FIG. 3 is a diagram illustrating the correspondence between the content management units, which are set with respect to content stored on the information recording medium, and unit keys;

FIG. 4 is a diagram illustrating encrypted content (CPS units) stored on the information recording medium and the encryption configuration for CPS unit keys.

FIGS. 5A to 5Bc are diagrams illustrating binding types of subsequently generated data and examples of data recorded as the binding types.

FIG. 6 is a diagram illustrating the processing sequence for acquiring device-binding type subsequently generated data;

FIG. 7 is a diagram illustrating the processing sequence executed by the information processor when recording the device-binding type subsequently generated data onto the local storage;

DESCRIPTION OF THE PREFERRED EMBODIMENTS

Hereinbelow, an information processor, an information processing method, and a computer program according to embodiments of the present invention will be described in detail with reference to the drawings. Note that the description will be made with regard to the following items.

1. Overview of data stored on an information recording medium and an information processor
2. With regard to content management units (CPS units)
3. Details of the processing for acquiring, recording, and using subsequently generated data
   (3.1) Details of the processing for acquiring, recording, and using device-bound subsequently generated data
   (3.2) Details of the processing for acquiring, recording, and using disc-bound subsequently generated data
   (3.3) Details of the processing for acquiring, recording, and using package-bound subsequently generated data
   (3.4) Details of the processing for acquiring, recording, and using subsequently generated data when a CPS unit key corresponding to the subsequently generated data is already stored on the information recording medium
   (3.5) Processing sequence for acquiring, recording, and using subsequently generated data
4. Example of the configuration of an information processor

[1. Overview of Data Stored on an Information Recording Medium and an Information Processor]

Figure 1:
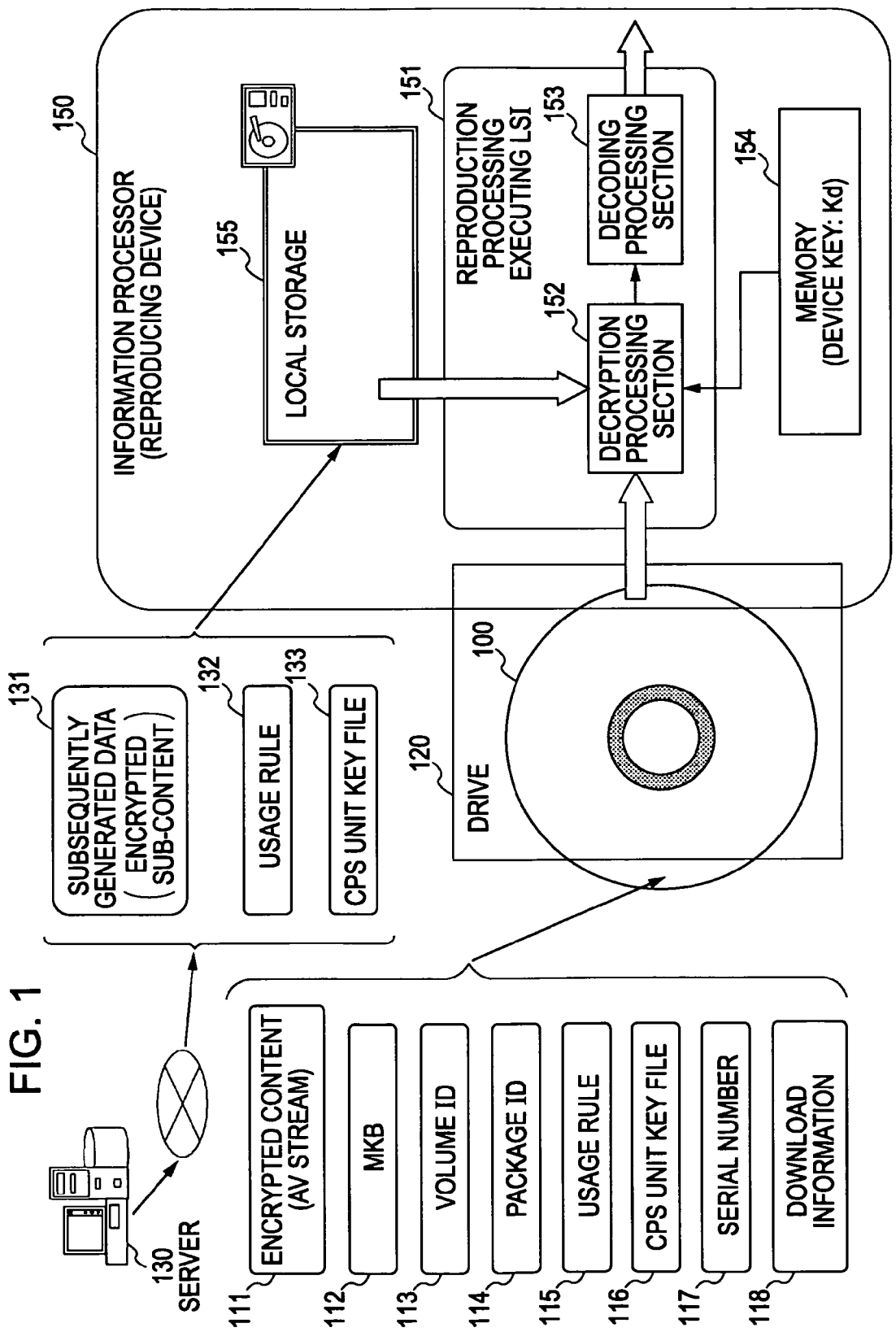
FIG. 1 is a diagram illustrating data stored on an information recording medium, and the configuration and processing of an information processor.

First, an overview of data stored on an information recording medium and an information processor will be described. FIG. 1 shows the configurations of an information recording medium 100 on which content is stored and of an information processor (reproducing device) 150. In this example, information is stored on a ROM disc serving as the disc on which the content has already been stored. Various types of information processor such as a PC or a read-only device are used as the information processor 150. The information processor 150 has a drive 120 for executing the processing of reading data from the information recording medium 100.

The ROM disc as the information recording medium 100 is, for example, an information recording medium such as a Blu-ray Disc (trademark) or a DVD, on which authorized content is stored and which is manufactured in disc manufacturing plants under the permission of so-called content owners having legitimate copyrights or distribution rights for the content. Note that while in the description of an embodiment below a disc-shaped medium is described as an example of the information recording medium, the present invention is applicable to configurations using various types of information recording medium.

As shown in FIG. 1, the information recording medium 100 stores encrypted content 111 that has been subjected to encryption processing, an MKB (Media Key Block) 112 as an encryption key block generated on the basis of a tree-structure key-distribution system known as one type of broadcast encryption system, a volume ID 113 set as identification information for each predetermined number of information recording media on a per-manufacturing unit basis, a package ID 114 set as identification information for each unit such as a content title, a content owner, or a studio, usage rules 115 including CCI (Copy Control Information) as the content copy/reproduction control information, a CPS unit key file 116 storing a CPS unit key as an encryption key set for each content management unit (CPS unit) as the content usage management unit, a serial number 117 set as an individual number for each information recording medium 100, and download information 118 such as the address of a server acquiring subsequently generated data. Hereinbelow, an outline of these various kinds of information will be described.

(1) Encrypted Content 111

Various contents are stored on the information recording medium 100. For example, the contents include AV (Audio Visual) stream of moving picture content such as HD (High Definition) movie content as high-definition moving picture data, or a game program, image file, sound data, or text data of a format specified by a specific standard. These contents are specific AV format standard data and are stored in accordance with a specific AV data format. More particularly, these contents are stored, for example, as Blu-ray Disc (trademark) ROM standard data in accordance with the Blu-ray Disc (trademark) ROM standard format.

Further, for example, a game program as service data, an image file, sound data, text data, or the like may be stored in some cases. These contents may in some cases be stored as data having a data format that does not conform to a specific AV data format.

As the kind of content, there are various contents such as music data, image data of moving pictures, still pictures, or the like, game programs, and WEB content. These contents may include various types of information such as content information that is usable only with data from the information recording medium 100 and content information that is usable with data provided from a server connected through a network together with data from the information recording medium 100. In order to achieve different usage controls for each sectioned content, the content stored on the information recording medium is stored in an encrypted form while having different keys (CPS unit keys or unit keys (or title keys, as they are often so called)) assigned to each sectioned content. The unit to which one unit key is assigned is referred to as the content management unit (CPS unit).

(2) MKB

MKB (Media Key Block) 112 is an encryption key generated on the basis of a tree-structure key-distribution system known as one type of broadcast encryption system. The MKB 112 is a key information block allowing the acquisition of a media key [Km], which is a key necessary for the decryption of content, only by processing (decryption) based on a device key [Kd] stored in an information processor of a user with a valid license. The MKB 112 represents an application of an information distribution system that complies with a so-called hierarchical tree structure; the acquisition of the media key [Km] is allowed only when the user device (information processor) has a valid license, and the media key [Km] cannot be acquired by a revoked user device.

A management center as a license entity can generate an MKB configured so that, through a change of the device key used for the encryption of key information stored in the MKB, the MKB cannot be decrypted with a device key stored in a specific user device, that is, a media key necessary for content decryption cannot be acquired. Accordingly, it is possible to provide encrypted content that can be decrypted with respect to only a device with a valid license by revoking an unauthorized device at arbitrary timing. The content decryption processing will be described later.

(3) Volume ID (Package ID)

The volume ID is set, for example, on a per-stamper basis, and is an ID set as identification information for each predetermined number of information recording media manufactured. The volume ID is used as information for generating a key used to decrypt content. Further, even when volume IDs are of the same title, in the case where two or more (stampers or mother discs) are created, different volume IDs may be set for each of the stampers or mother discs. These processing will be described later.

(4) Package ID

The package ID is an ID commonly set for information media recording contents having the same title, for example, or for information media storing contents provided by the same studio that is a content creating company. The package ID is set as identification information for an information recording medium for each unit such as a content title, a content owner, or a studio. That is, unlike the volume ID, package IDs become the same single ID when the titles are the same.

(5) Usage Rules

The usage rules include, for example, copy control information (CCI), which includes copy restriction information or reproduction restriction information for usage control corresponding to the encrypted content 111 stored on the information recording medium 100. The copy control information (CCI) allows various settings, including a case where it is set as information for each individual CPS unit set as the content management unit or a case where when it is set in correspondence with a plurality o CPS units. The details of this information will be described later. Note that the usage rules stored on the information recording medium 100 are stored as encrypted data. The specific encryption structure will be described later.

(6) CPS Unit Key File

As described above, the encrypted content 111 stored on the information recording medium 100 is encrypted with an encryption key for each individual CPS unit set as the content management unit. Image data such as AV (Audio Visual) stream, music data, image data such as moving pictures or still pictures, a game program, WEB content, or the like constituting content and encoded by MPEG-2, MPEG4-AVC, VC1, or the like is sectioned into CPS units as the management units for content usage. It is required that the information processor that is to execute reproduction processing determine the CPS unit to which the content to be reproduced belongs, and perform decryption processing using a CPS unit key as the encryption key corresponding to the thus determined CPS unit. A file storing data necessary for acquiring this CPS unit key is the CPS unit key file. The details of the CPS unit key file will be described later. Note that for the reproduction of content, not only a CPS unit key but also various other key information, key generation information, and the like need to be used. The specific processing in this case will be also described later.

(7) Serial Number

A serial number is a number set as an individual number for each information recording medium 100.

(8) Download Information

The download information includes, when there is data that can be subsequently acquired in correspondence with data stored on the information recording medium 100, for example, the encrypted content 111, information necessary for the acquisition of the subsequently generated data. More specifically, the download information includes the address of the server for acquiring the subsequently generated data, and information used to determine which of the contents in the server is to be downloaded, such as information (studio ID) for identifying the content owner or information (package ID) for identifying a disc (or content) provided by the content owner. Note that when the encrypted content 111 is a movie in a foreign language, for example, the subsequently generated data refers to various kinds of data such as the subtitle data, narration data, or additional bonus data for the movie.

A server 130 shown in FIG. 1 is a server that provides the subsequently generated data. The server 130 executes communication processing with the information processor 150 in accordance with a predetermined sequence, and transmits to the information processor 150 encrypted sub-content as subsequently generated data 131, usage rules 132 with respect to the subsequently generated data 131, and the CPS unit key file as the encryption key information applied to the subsequently generated data 131. The information processor 150 stores and saves these data on, for example, a local storage 155 such as a hard disk. Note that the details of the subsequently generated data acquisition processing sequence will be described later.

FIG. 1 shows the schematic configuration of the information processor 150 that executes the reproduction processing of content stored on the information recording medium 100. The information processor 150 has the drive 120 for executing the processing of reading data stored on the information recording medium 100. The data read by the drive 120 is input to a reproduction processing executing LSI 151 for executing the decryption processing and decode (for example, MPEG decoding) processing of the encrypted content.

The reproduction processing executing LSI 151 has a decryption processing section 152 for executing the decryption processing of the encrypted content, and a decoding processing section 153 for executing decoding (for example, MPED decoding) processing. The decryption processing section 152 generates a key used to decrypt content by using various kinds of information stored in a memory 154 and the data read from the information recording medium 100, and then executes the decryption processing of the encrypted content 111.

Further, the reproduction processing executing LSI 151 also executes the decryption processing of subsequently generated data stored on a local storage 155. For example, the reproduction processing executing LSI 151 reads movie content from the information recording medium 100 and decrypts the movie content and, at the same time, executes decryption of subtitle data as encrypted subsequently generated data from the local storage 155 and performs the processing of reproducing these data together.

A device key: Kd is stored in the memory 154 of the information processor 150. The device key: Kd is a key applied to the processing of the MKB described above. The MKB 112 is a key information block that allows acquisition of the media key [Km], which is necessary for the decryption of content, only through processing (decryption) based on the device key [Kd] stored in the information processing device of the user with a valid license. For the decryption of encrypted content, the information processor 150 executes the processing of the MKB 112 by using the device key: Kd stored in the memory 154. Note that the details of the content decryption processing will be described later.

[2. With Regard to Content Management Units (CPS Units)]

As described above, in order to realize different usage controls for each unit, the content to be stored on the information recording medium is subjected to encryption processing while having different keys assigned to each unit. That is, the content is sectioned into the content management units (CPS units) for individual encryption processing to enable individual usage control.

To use the content, first, it is necessary to acquire the CPS unit keys assigned to the respective units and, further, by using other necessary keys, key generation information, or the like, data processing based on a prescribed decryption sequence is executed to thereby perform reproduction. Description will given of how the content management units (CPS units) are set with reference to FIG. 2.

As shown in FIG. 2, the content has a layered structure including (A) an index 210, (B) a movie object 220, (C) a playlist, and (D) a clip 240. Upon designating an index such as a title to be accessed by the reproducing application, for example, a program to be reproduced associated with the title is designated, and a playlist defining the order of reproducing the content or the like is selected in accordance with program information of the designated reproducing program.

A playlist includes play items as the data information to be reproduced. By means of clip information as a reproduction section defined by the play items included in the playlist, an AV stream or command as the actual content data is selectively read to perform the reproduction of the AV stream or the execution of the command. Note that there are a large number of playlists and play items, each of which is associated with a playlist ID or a play item ID as identification information.

FIG. 2 shows two CPS units. These CPS units constitute a part of the content stored on the information recording medium. Each of a CPS unit 1, 271 and a CPS unit 2, 272 is set as a unit including a title as an index, a movie object as a reproducing program file, a playlist, and a clip including an AV stream file as actual content data.

The content management unit (CPS) unit 1, 271 includes a title 1, 211 and a title 2, 212, reproducing programs 221, 222, playlists 231, 232, and a clip 241 and a clip 242. At least AV stream data files 261, 262 as the actual data of the contents included in the two respective clips 241, 242 are the data to be encrypted, which, as a general rule, are each set as data encrypted with a CPS unit key (Ku1) that is an encryption key set in association with the content management unit (CPS unit) 1, 271.

The content management unit (CPS unit) 2, 272 includes an application 1, 213 as an index, a program to be reproduced 224, a playlist 233, and a clip 243. An Av stream data file 263 as the actual data of the content included in the clip 243 is encrypted with a CPS unit key (Ku2) that is an encryption key set in association with the content management unit (CPS unit) 2, 272.

For instance, for the user to execute reproduction processing of an application file or content corresponding to the content management unit 1, 271, it is necessary to acquire the unit key: Ku1 that is an encryption key set in association with the content management unit (CPS unit) 1, 271, and then executing the decryption processing. For the user to execute reproduction processing of an application file or content corresponding to the content management unit 2, 272, it is necessary to acquire the unit key: Ku2 that is an encryption key set in association with the content management unit (CPS unit) 2, 272, and then executing the decryption processing.

The setting configurations of the CPS units, and examples of the corresponding unit keys are shown in FIG. 3. FIG. 3 shows the correspondence between CPS unit setting units as the usage management units of decrypted content stored on the information recording medium, and CPS unit keys applied to the respective CPS units. Note that it is also possible to store and set CPS units and CPS units for subsequently generated data in advance. For example, a data section 281 serves as an entry for subsequently generated data.

The CPS units are set in various units such as the title of content, application, data group, and the like. In a CPS unit management table, CPS unit IDs are set as identifiers corresponding to the respective CPS units.

In FIG. 3, Title 1 is, for example, the CPS unit 1. For decryption of encrypted content belonging to the CPS unit 1, it is necessary to generate the unit key Ku1, and perform decryption processing based on the generated unit key Ku1.

As described above, in order to realize different usage controls for each unit, the content to be stored on the information recording medium is subjected to encryption processing while having different keys assigned to each unit. Usage rules (UR) for each content management unit (CPS unit) are set to perform individual usage control for each content management unit (CPS unit). As described above, the usage rules are information including, for example, copy control information (CCI) with respect to content, that is, copy restriction information or reproduction restriction information for encrypted content included in each content management unit (CPS unit).

Referring to FIG. 4, description will be given of the encryption mode for CPS units including the content stored on the information recording medium 100, and the specific data structure of CPS unit key files set as the storage files for CPS unit keys used for decryption of the respective CPS units. As shown in FIG. 4, each CPS unit (CPS_Unit#n) is stored as data [Enc(Ku_n, CPS_Unit#n)] encrypted with a corresponding unit key (Ku_n). Note that Enc(A, B) indicates encrypted data of data (B) encrypted with a key (A).

Each CPS unit key [Ku_n] is stored as encrypted data in each CPS unit key file set as the storage file for a CPS unit key used to decrypt each of the CPS units stored on the information recording medium 100. That is, as shown in FIG. 4, a CPS unit key [Ku_n] for a CPS unit (CPS_Unit#n) is stored on the information recording medium 100 as encrypted data in which a volume unique key [Ke (embedded Key)] is applied to the computation results [f(Ku_n, UR#n)] with the corresponding usage rules (UR#n), that is, as [Enc(Ke, f(Ku_n, UR#n)].

Note that f(A, B) indicates computation between data A and data B. f(Ku_n, UR#n) represents, for example, computation processing such as exclusive OR operation between a unit key [Ku_n] for a CPS unit (CPS_Unit#n) and usage rules (UR#n), and is stored on the information recording medium 100 as data encrypted with the volume unique key [Ke] with respect to the computation results. Note that the volume unique key [Ke (embedded Key)] is a key set in correspondence with the volume ID of the information recording medium 100.

As described above, the content pre-stored on the information recording medium 100 is sectioned into the CPS units, stored as encrypted data encrypted with a unit key corresponding to each of the units, and is subjected to usage control based on usage rules corresponding to each of the CPS units.

Usage management based on CPS units can be performed also on content other than the content pre-stored on the information recording medium 100, for example, subsequently generated data such as data subsequently generated or externally acquired by the user. In the following, description will be given of the acquisition processing and usage control processing for subsequently generated data.

[3. Acquisition and Management Configurations for Subsequently Generated Data]

As shown in FIG. 1, subsequently generated data acquired from the server 130, for example, the subsequently generated data (encrypted sub-content) 131 such as subtitle data corresponding to movie content, is also set as data belonging to the CPS unit. Note that there are a case where the CPS unit for the subsequently generated data is set as a, new CPS unit and a case where a CPS unit previously set for the information recording medium 100 is used as the CPS unit.

When the subsequently generated data 131 belongs to a CPS unit previously set for the information recording medium 100, usage rules (UR) stored on the information recording medium 100 in correspondence with the preset CPS unit can be used as the usage rules (UR) for the subsequently generated data. On the other hand, when the CPS unit for the subsequently generated data is set as a new CPS unit, the server 130 provides to the information processor 150 of the user the usage rules (UR) 132 corresponding to the subsequently generated data 131, and a CPS unit key file 133 storing a unit key corresponding to the new CPS unit.

Note that, as will be described later, there are cases where a binding type different from the content pre-stored on the information recording medium 100 is set for subsequently generated data. In the case of subsequently generated data for which a binding type is set, usage rules (UR) describing the binding type are provided to the information processor of the user as the usage rules (UR) for the subsequently generated data. Even in the case where the subsequently generated data 131 belongs to a CPS unit pre-stored on the information recording medium 100, when a binding type is to be set, usage rules (UR) describing the binding type corresponding to the subsequently generated data are provided to the information processor 150 of the user.

The information processor 150 stores the subsequently generated data onto the local storage 155, such as a hard disk, within the information processor 150 shown in FIG. 5 for use. Note that the local storage 155 used is not limited to a hard disk but may be a flash memory-type card memory or a removable medium such as a data-writable DVD.

As for the use of the subsequently generated data stored on the local storage, similarly to the content corresponding to the CPS unit stored on the information recording medium 100, the use of the subsequently generated data is performed in accordance with the usage restrictions as specified by the usage rules corresponding to the CPS unit to which the subsequently generated data belongs. Further, it is required to acquire a CPS unit key that is set in correspondence with the CPS unit corresponding to the subsequently generated data, and executes the decryption of encrypted data as the subsequently generated data.

Like the content corresponding to the CPS unit pre-stored on the information recording medium 100, the subsequently generated data stored on the local storage 155 is also used under predetermined usage control management. Accordingly, for example, the subsequently generated data is prevented from being copied onto an external storage medium for unauthorized use by a third person not having the right to use the content.

Unlike the content pre-stored on the information recording medium 100, subsequently generated data is subject to usage restriction modes unique to the subsequently generated data. That is, subsequently generated data is sectioned into the following four kinds (binding types) according to the usage restriction modes unique to the subsequently generated data.

(1) Device-bound subsequently generated data: The use of subsequently generated data is permitted only for the device (information processor) that has acquired (downloaded) the subsequently generated data.

(2) Disc-bound subsequently generated data: The use of subsequently generated data is permitted only in the case where a disc having the same serial number as that of the information recording medium (disc) used when acquiring (downloading) the subsequently generated data is set in the information processor.

(3) Package-bound subsequently generated data: The use of subsequently generated data is permitted only in the case where an information recording medium (disc) having the same package ID as that of the information recording medium (disc) used when acquiring (downloading) the subsequently generated data is set in the information processor.

(4) Unbound subsequently generated data: Subsequently generated data for which no particular usage restrictions are provided.

(5) Other subsequently generated data: Subsequently generated data other than those described in the items (1) to (4) above. Other subsequently generated data includes, for example, subsequently generated data for which usage restrictions are set by a method developed by a studio as an entity providing the content on its own. These include, for example, subsequently generated data that has been subjected to encryption using a program such as a JAVA application, and the like.

When the information processor 150 shown in FIG. 1 acquires the subsequently generated data 131 from the server 130, the usage rules (Usage Rule) 132 are provided as shown in FIG. 1. The usage rules (Usage Rule) 132, in which usage restriction information for the subsequently generated data to be acquired is recorded, includes description on the binding types indicating the usage restriction modes for subsequently generated data described in the items (1) to (5) above.

The specific description examples of the binding types included in the usage rules (Usage Rule) corresponding to subsequently generated data will be described with reference to FIG. 5.

FIG. 5A shows an example of the correspondence between the binding types and codes (8 bits) corresponding to subsequently generated data. In the illustrated example, these codes or binding types are designated on a per CS unit basis and recorded in the usage rules (Usage Rule) corresponding to subsequently generated data. FIG. 5Ba shows an example of usage rules (UR) in which the binding type of subsequently generated data is recorded by XML description. FIG. 5Bb shows an example of usage rules (UR) in which the binding type of subsequently generated data is designated on a per CPS unit basis and the code data of the binding type of subsequently generated data is recorded by binary description in 8 bits.

Note that the binding type may not necessarily be recorded in the usage rules (Usage Rule) but may be recorded in a data file different from the usage rules (Usage Rule). For example, the binding types corresponding to respective subsequently generated data may be recorded in a subsequently generated data search information file storing the search data for subsequently generated data. FIG. 5Bc shows such a case, where data in which the names of subsequently generated data recorded on the local storage and the binding types are associated with each other is recorded.

When the information processor acquires new subsequently generated data and records it onto the local storage, the file name and bind information corresponding to the subsequently generated data are acquired, and the subsequently generated data search information file storing the search data for subsequently generated data is updated. As shown in FIG. 5Bc, in the case where the binding type for each subsequently generated data is recorded in the subsequently generated data search information file, when using the subsequently generated data, the information processor can read the subsequently generated data search information file stored on the local storage to acquire the binding type of the subsequently generated data that is required, whereby the binding type of each subsequently generated data can be checked in an efficient manner.

Next, referring to FIG. 6 and onwards, with regard to:
(1) Device-bound subsequently generated data;
(2) Disc-bound subsequently generated data; and
(3) Package-bound subsequently generated data, the details of the following three processing sequences:
(a) Processing of acquiring subsequently generated data;
(b) Processing for recording the subsequently generated data onto the local storage; and
(c) Processing of decrypting and using the subsequently generated data recorded on the local storage,
will be respectively described in the stated order.

[(3.1) Details of the Processing for Acquiring, Recording, and Using Device-Bound Subsequently Generated Data]

First, the processing for acquiring, recording, and using device-bound subsequently generated data will be described in detail.

As described above, device-bound subsequently generated data is a type of subsequently generated data that permits only the device (information processor) that has acquired (downloaded) the subsequently generated data to use the subsequently generated data.

(3.1.a) Acquisition Processing for Device-Bound Subsequently Generated Data

The acquisition processing for device-bound subsequently generated data will be described with reference to FIG. 6. In FIG. 6, the information processor that acquires subsequently generated data is shown on the left-hand side, and the server that provides the subsequently generated data is shown on the right-hand side.

The information processor executes the acquisition processing for subsequently generated data with the above-described information recording medium storing the content sectioned into the CPS units being loaded in the drive of the information processor. The information recording medium, whose volume ID=#m, stores:

Encrypted contents: Enc(Ku_1, CPS_Unit#1) to Enc(Ku_n, CPS_Unit#n); and

CPS unit key files: Enc(Ke, f(Ku_1, UR#1) to (Ke, f Ku_n, UR#n).

Further, the various kinds of information described with reference to FIG. 1 are recorded on the information recording medium. FIG. 6 shows respective data of the volume ID, download information, MKB, and the like as part of such information.

Further, the device key [Kd] is stored in the memory of the information processor. The device key [Kd] is a key applied to the processing of the MKB. The MKB is a key information block that allows the media key [Km], which is a key necessary for decrypting content, to be acquired only through processing (decryption) based on the device key [Kd] stored in the information processor of the user with a valid license. To decrypt the encrypted content, the information processor executes the MKB processing using the device key [Kd] stored in the memory. Note that the details of the content decryption processing will be described later.

Further, as shown in FIG. 6, the server that provides subsequently generated data stores, in association with the volume ID and download information:

Encrypted sub-content [Enc(Ku_n+1, CPS_Unit#n+1)] as subsequently generated data;

CPS unit key file [Enc(Ke, f(Ku_n+1, UR#n+1))] created by encrypting a unit key used to decrypt the encrypted sub-content as subsequently generated data; and Usage rules (UR: Usage Rule#n+1) corresponding to the encrypted sub-content as subsequently generated data.

The respective processing of steps S101 to S107 will be described. In step S101, the information processor transmits to the server the volume ID (Volume ID#m) and download information (Download_info) acquired from the information recording medium.

In step S102, the server that has received the volume ID (Volume ID#m) and the download information (Download_info) executes database search, and acquires data stored in association with the volume ID (Volume ID#m) and the download information (Download_info), that is, the server acquires the following respective data:

CPS unit key file [Enc(Ke, f(Ku_n+1, UR#n+1))] created by encrypting a unit key used to decrypt the encrypted sub-content as subsequently generated data;

Usage rules (UR: Usage Rule#n+1) corresponding to the encrypted sub-content as subsequently generated data; and Encrypted sub-content [Enc(Ku_n+1, CPS_Unit#n+1)] as subsequently generated data, and transmits these acquired data to the information processor in steps S103 and S104. Note that the transmitting server in step S103 serves to create the encrypted sub-content from the transmitted volume ID and download information, and the transmitting server in step S104 serves to retain the corresponding content; These servers may of course be the same or may be a plurality of servers capable of communicating information with each other.

Upon receiving the data transmitted from the server, in step S105, the information processor decrypts, with the volume unique key [Ke], data of the CPS unit key file, that is, the CPS unit key file [Enc(Ke, f(Ku_n+1, UR#n+1))] created by encrypting a unit key used to decrypt the encrypted sub-content. In step S106, the information processor executes the binding processing with the device key [Kd] stored in the memory, and decryption processing to thereby generate an encrypted bind unit key [Enc(Ke, f(Ku_n+1, UR#n+1, Kd))]. Note that the details of these data processing will be described later with reference to FIG. 7.

In step S107, the data acquired from the server, including:

Encrypted sub-content [Enc(Ku_n+1, CPS_Unit#n+1)] as subsequently generated data; and Usage rules (UR: Usage Rule#n+1) corresponding to the encrypted sub-content as subsequently generated data; and data generated by the information processor on the basis of the CPS unit key file [Enc(Ke, f(Ku_n+1, UR#n+1))] acquired from the server, that is:

Encrypted bind unit key [Enc(Ke, f(Ku_n+1, UR#n+1, Kd))], are stored onto the local storage.

(3.1.b) Processing for Recording Device-Bound Subsequently Generated Data onto the Local Storage Next, referring to FIG. 7, the processing for recording device-bound subsequently generated data onto the local storage, in particular, the processing sequence for generating the encrypted bind unit key [Enc(Ke, f(Ku_n+1, UR#n+1, Kd))] will be described.

FIG. 7 shows an information processor 300 for acquiring subsequently generated data or the like from a server and storing the acquired data and the processing data with respect to the acquired data onto a local storage 320, a server 400 that provides the subsequently generated data or the like, and the information recording medium 100 loaded into the information processor 300.

Although the information recording medium 100 stores the various kinds of data described above with reference to FIG. 1, in the illustrated example, only the MKB 112 as an encryption key block, and the volume ID 113 are shown as data to be applied to the processing for recording device-bound subsequently generated data onto the local storage.

As described above with reference to FIG. 6, the server provides the following data to the information processor 300:

Encrypted sub-content [Enc(Ku_n+1, CPS_Unit#n+1)] 403 as subsequently generated data;

CPS unit key file [Enc(Ke, f(Ku_n+1, UR#n+1))] 401 created by encrypting a unit key used to decrypt the encrypted sub-content 403 as subsequently generated data; and Usage rules (UR: Usage Rule#n+1) 402 corresponding to the encrypted sub-content 403 as subsequently generated data.

The processing of the information processor 300 will be described. First, the information processor 300 reads a device key [Kd] 301 stored in the memory. The device key 301 is a secret key stored in an information processor that has received a license on content usage.

Next, in step S121, the information processor 300 acquires the media key Km by executing, with the device key 301, the decryption processing of the MKB 112 that is an encryption key block storing the media key Km which is stored on the information recording medium 100.

Next, in step S122, the volume unique key Ke (embedded Key) is generated through encryption processing based on the media key Km acquired by the MKB processing in step S121, and the volume ID 113 read from the information recording medium 100. This key generation processing is executed as processing in accordance with, for example, an AES encryption algorithm.

Figure 8:
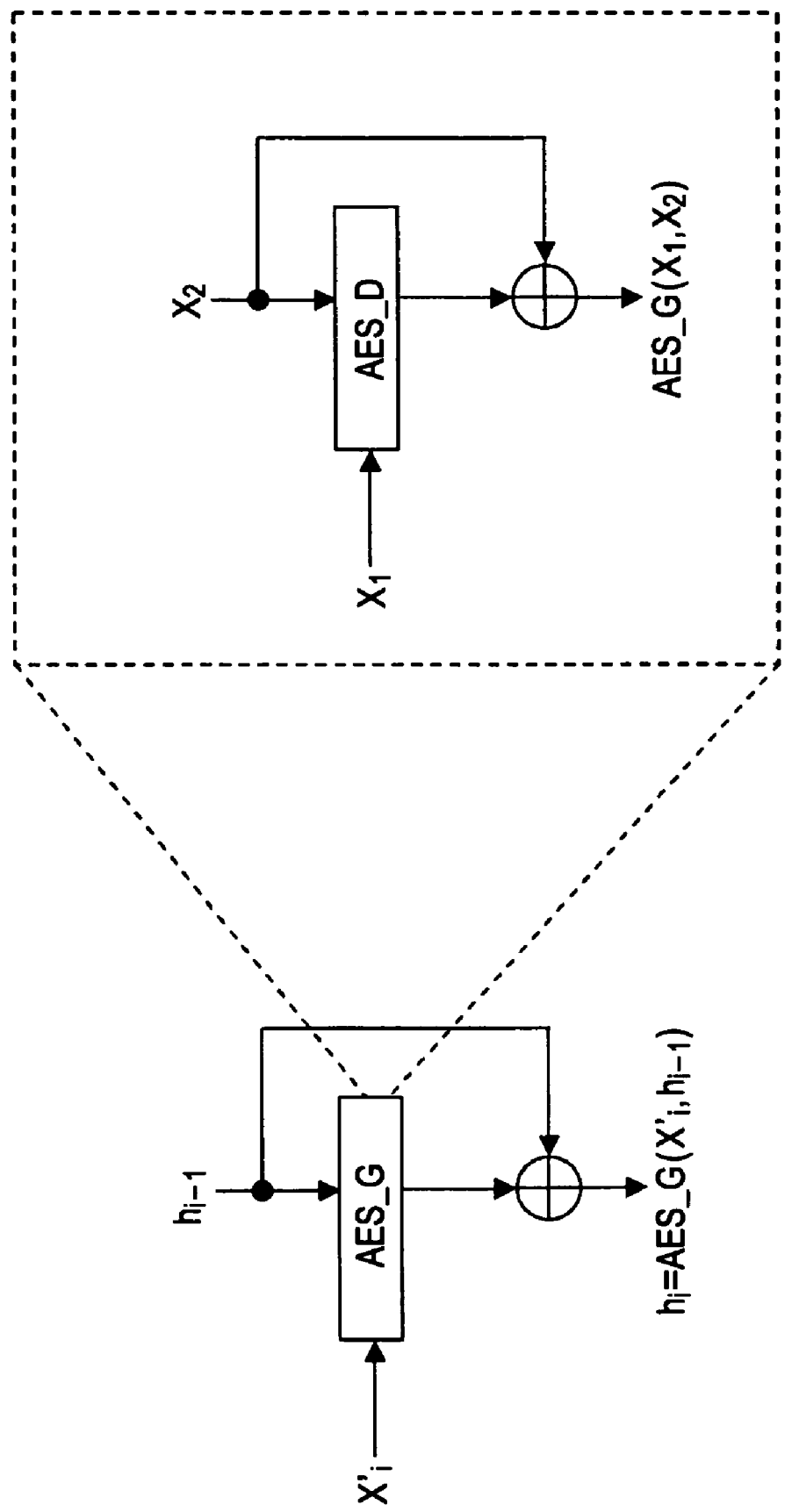
FIG. 8 is a diagram illustrating an AES encryption algorithm.

The AES encryption algorithm will be described in detail with reference to FIG. 8. As the processing in accordance with the AES encryption algorithm, for example, an AES-based hashing function [AES_H] is implemented. As shown in FIG. 8, the AES-based hashing function is constructed by the combination of a key generation processing executing section (AES_G) involving data decryption processing to which the AES encryption processing is applied, and an exclusive OR section. Further, as shown in FIG. 8, the AES_G section is constructed by the combination of an AES decryption section [AES_H] and the exclusive OR section.

The processing of generating the volume unique key Ke in step S122 in FIG. 7 is executed as, for example, processing to which the AES-based hashing function [AES_H] is applied, with the media key Km acquired in the MKB processing in step S121 and the volume ID 113 read from the information recording medium 100 serving as inputs.

Next, in step S123, using the volume unique key Ke, the decryption processing of a CPS unit key file [Enc(Ke, f(Ku_n+1, UR#n+1))] 311 (=401) acquired from the server is executed. Through this decryption processing, Data [Kt]=f(Ku_n+1, UR#n+1) is acquired from:

CPS unit key file [Enc(Ke, f(Ku_n+1, UR#n+1))].

Next, in step S124, bind unit key (BKu) data is generated by executing computation processing to which the device key [Kd] stored in the memory of the information processor 300 and usage rules (UR: Usage Rule#n+1) 321 (=402) corresponding to the subsequently generated data acquired from the server are applied. The bind unit key (BKu) is the following data.

BKu=f(Ku_n+1, UR#n+1, Kd)

The bind unit key: BKu=f(Ku_n+1, UR#n+1, Kd) is computation result data of exclusive OR operation or the like between the unit key [Ku_n+1] corresponding to the CPS unit #n+1, the usage rules [UR#n+1], and the device key [Kd].

Further, in step S125, the encryption processing of the bind unit key: BKu=f(Ku_n+1, UR#n+1, Kd) is executed with the volume unique key Ke calculated in step S122, and an encrypted bind unit key [Enc(Ke, f(Ku_n+1, UR#n+1, Kd))] is generated and stored onto the local storage 320.

Note that the local storage 320 stores:

Encrypted bind unit key [Enc(Ke, f(Ku_n+1, UR#n+1, Kd))] 323 generated by the above-described processing; and the following data acquired from the server:

Encrypted sub-content [Enc(Ku_n+1, CPS_Unit#n+1)] 322 (=403) as subsequently generated data; and Usage rules (UR: Usage Rule#n+1) 321 (=402) corresponding to the encrypted sub-content 322 as subsequently generated data.

Figure 9:
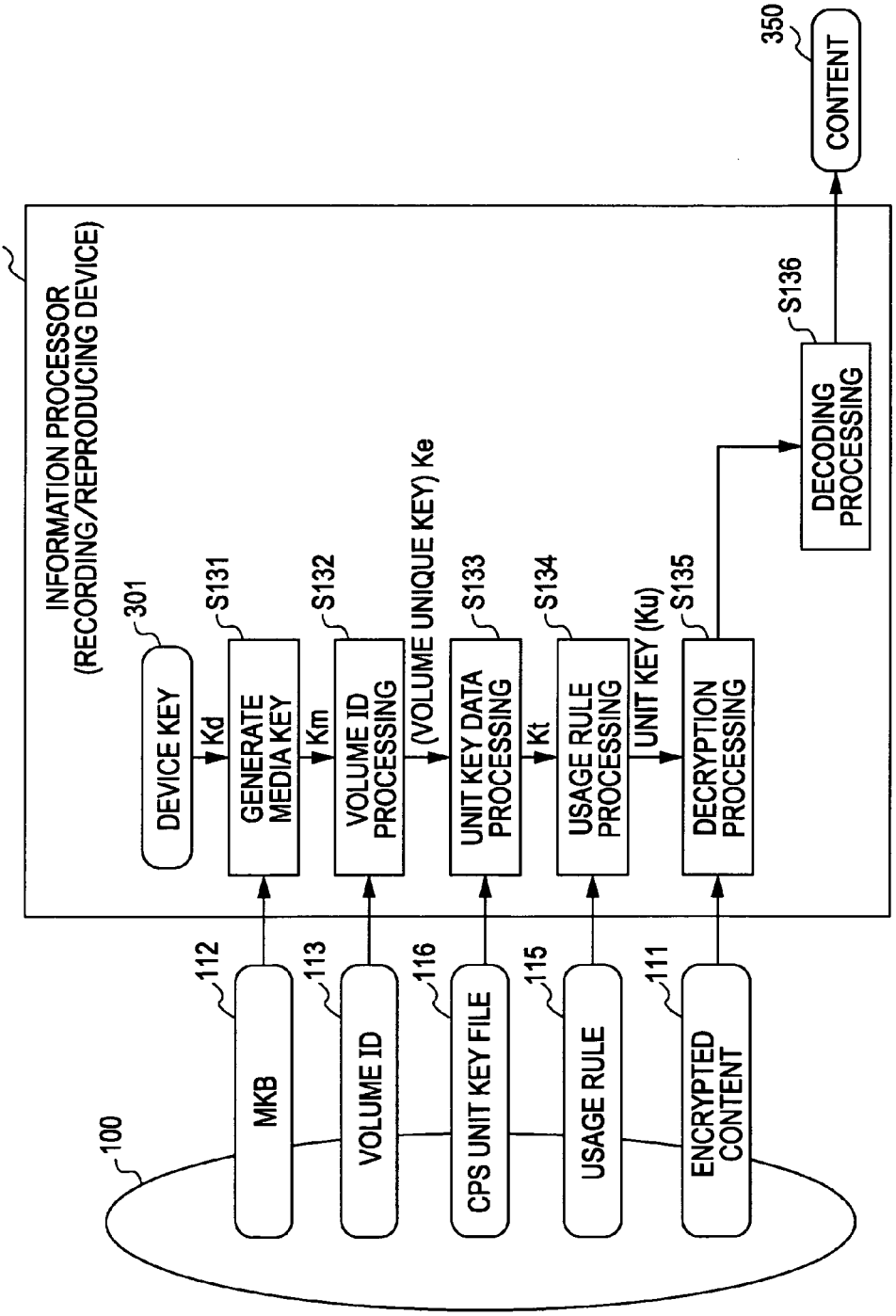
FIG. 9 is a diagram illustrating the processing sequence for reproducing the content stored on the information recording medium.

(3.1.c) Processing for Decrypting and Using Device-Bound Subsequently Generated Data Recorded on the Local Storage Next, the processing for using device-bound subsequently generated data recorded on the local storage will be described. The processing for using device-bound subsequently generated data recorded on the local storage is executed as processing similar to data processing for using content recorded on the information recording medium. First, the data processing for using the content recorded on the information recording medium will be described with reference to FIG. 9.

First, the information processor 300 reads the device key [Kd] 301 stored in the memory. The device key 301 is a secret key stored in an information processor that has received a license on content usage.

Next, in step S131, the information processor 300 acquires the media key Km by executing, with the device key 301, the decryption processing of the MKB 112 as an encryption key block storing the media key Km which is stored on the information recording medium 100.

Next, in step S132, the volume unique key Ke (embedded Key) is generated through encryption processing based on the media key Km acquired by the MKB processing in step S131, and the volume ID 113 read from the information recording medium 100. This key generation processing is executed as processing in accordance with, for example, the AES encryption algorithm described above with reference to FIG. 8.

Next, in step S133, the decryption processing of the CPS unit key file 116, that is, [Enc(Ke, f(Ku_n+1, UR#n+1))] read from the information recording medium 100 is executed. Note that the CPS unit used at this time is assumed to be a CPS unit [CPS_Unit#n].

Through the decryption processing of the CPS unit key file 116 in step S133,

Data [Kt]=f(Ku_n+1, UR#n+1)

is acquired, and in step S134, with respect to:

Data [Kt]=f(Ku_n+1, UR#n+1), computation processing to which the usage rules (UR: Usage Rule#n) 115 read from the information recording medium 100 are applied is executed, thereby obtaining the unit key [Ku_n].

When, for instance, the data [Kt]=f(Ku_n+1, UR#n+1) is exclusive OR (XOR) result data between the unit key [Ku_n] and the usage rules (UR#n), the unit key [Ku_n] can be acquired by executing an exclusive OR (XOR) operation of the usage rules (UR#n) read from the information recording medium 100 again with respect to the above computation result.

Next, in step S135, with respect to the encrypted content read from the information recording medium 100, decryption processing (for example, AES_D) with the unit key [Ku_n] is executed. In step S136, necessary decoding processing, such as MPEG decoding, compression/decompression, or descrambling, is executed to acquire content 350.

Through this processing, the encrypted content managed as a CPS unit stored on the information recording medium 100 can be decrypted for use, that is, for reproduction.

Figure 10:
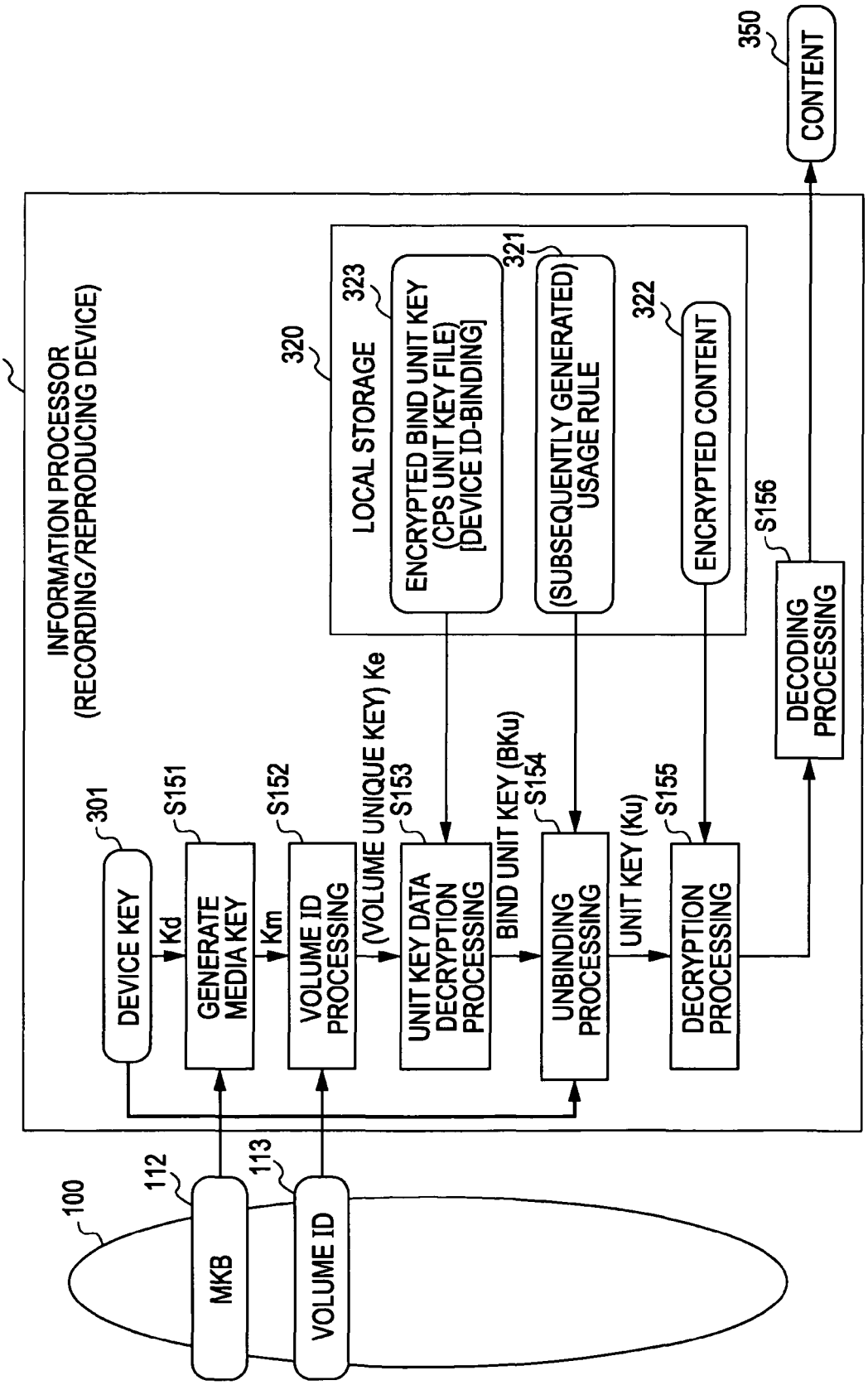
FIG. 10 is a diagram illustrating the processing sequence for reproducing the device-binding type subsequently generated data.

Next, referring to FIG. 10, description will be given of the processing for using the encrypted sub-content 322 as subsequently generated data stored on the local storage 320. It is assumed that the local storage 320 stores the following data as the data stored through the processing described above with reference to FIGS. 6 and 7:

Encrypted sub-content [Enc(Ku_n+1, CPS_Unit#n+1)] 322 as subsequently generated data;

Usage rules (UR: Usage Rule#n+1) 321 (=402) corresponding to the encrypted sub-content 322 as subsequently generated data; and Encrypted bind unit key [Enc(Ke, f(Ku_n+1, UR#n+1, Kd))] 323.

First, the information processor 300 reads the device key [Kd] 301 stored in the memory. The device key 301 is a secret key stored in an information processor that has received a license on content usage.

Next, in step S151, the information processor 300 acquires the media key Km by executing, with the device key 301, the decryption processing of the MKB 112 as an encryption key block storing the media key Km which is stored on the information recording medium 100.

Next, in step S152, the volume unique key Ke is generated through encryption processing based on the media key Km acquired by the MKB processing in step S151, and the volume ID 113 read from the information recording medium 100. This key generation processing is executed as processing in accordance with, for example, the AES encryption algorithm described above with reference to FIG. 8.

Next, in step S153, using the volume unique key Ke, the decryption processing of the encrypted bind unit key [Enc (Ke, f(Ku_n+1, UR#n+1, Kd))] 323 read from the local storage 320 is executed.

Through the decryption processing of the encrypted bind unit key [Enc(Ke, f(Ku_n+1, UR#n+1, Kd))] 323 in step S153, Bind unit key [BKu]=f(Ku_n+1, UR#n+1, Kd)
is acquired, and in step S154, with respect to:
Bind unit key [BKu]=f(Ku_n+1, UR#n+1, Kd),
computation processing, to which the usage rules (UR: Usage Rule#n+1) 321 read from the local storage 320 and the device key [Kd] stored in the memory of the information processor 300 are applied, is executed, thereby obtaining the unit key [Ku_n+1].

When, for instance, the bind unit key [BKu]=f(Ku_n+1, UR#n+1, Kd) is exclusive OR (XOR) data between the unit key [Ku_n+1], the usage rules (UR#n+1), and the device key [Kd], the unit key [Ku_n+1] can be acquired by executing an exclusive OR (XOR) operation between the usage rules (UR: Usage Rule#n+1) 321 read from the local storage 320 and the device key [Kd] stored in the memory of the information processor 300, again with respect to the bind unit key [BKu].

Next, in step S155, with respect to the encrypted sub-content [Enc(Ku_n+1, CPS_Unit#n+1)] 322 read from the local storage 320, decryption processing (for example, AES_D) with the unit key [Ku_n+1] is executed. In step S156, necessary decoding processing, such as MPEG decoding, compression/decompression, or descrambling, is executed to acquire the content 350.

Through this processing, the encrypted sub-content [Enc (Ku_n+1, CPS_Unit#n+1)] 322 as the subsequently generated data stored in the local storage 320 can be decrypted for use, that is, for reproduction.

In this way, as for the device-bound subsequently generated data, when storing the subsequently generated data acquired from the server onto the local storage, as described above with reference to FIG. 7, the CPS unit key and the device key [Kd] are bound together through the processing of the CPS unit key file received from the server, and encrypted and stored onto the local storage in the form of an encrypted bind unit key; to use the subsequently generated data, as described above with reference to FIG. 10, it is necessary to perform processing using the device key [Kd] in order to acquire the unit key from the encrypted bind unit key stored on the local storage.

The requisite condition for the unbinding and unit key acquisition is that the device key [Kd] used when reproducing subsequently generated data be the same key [Kd] used when recording the subsequently generated data. Accordingly, as described above, the device-bound subsequently generated data is subsequently generated data whose use is permitted only to the device (information processor) that has acquired (downloaded) the subsequently generated data.

[(3.2) Details of the Processing for Acquiring, Recording, and Using Disc-Bound Subsequently Generated Data]

Next, the acquisition, recording, and use processing for disc-bound subsequently generated data will be described in detail. As described above, the disc-bound subsequently generated data is a type of subsequently generated data whose use is permitted only when the information processor is loaded with a disc having the same serial number as that of the information recording medium (disc) used when acquiring (downloading the subsequently generated data.

(3.2.a) Acquisition Processing for Disc-Bound Subsequently Generated Data

Figure 11:
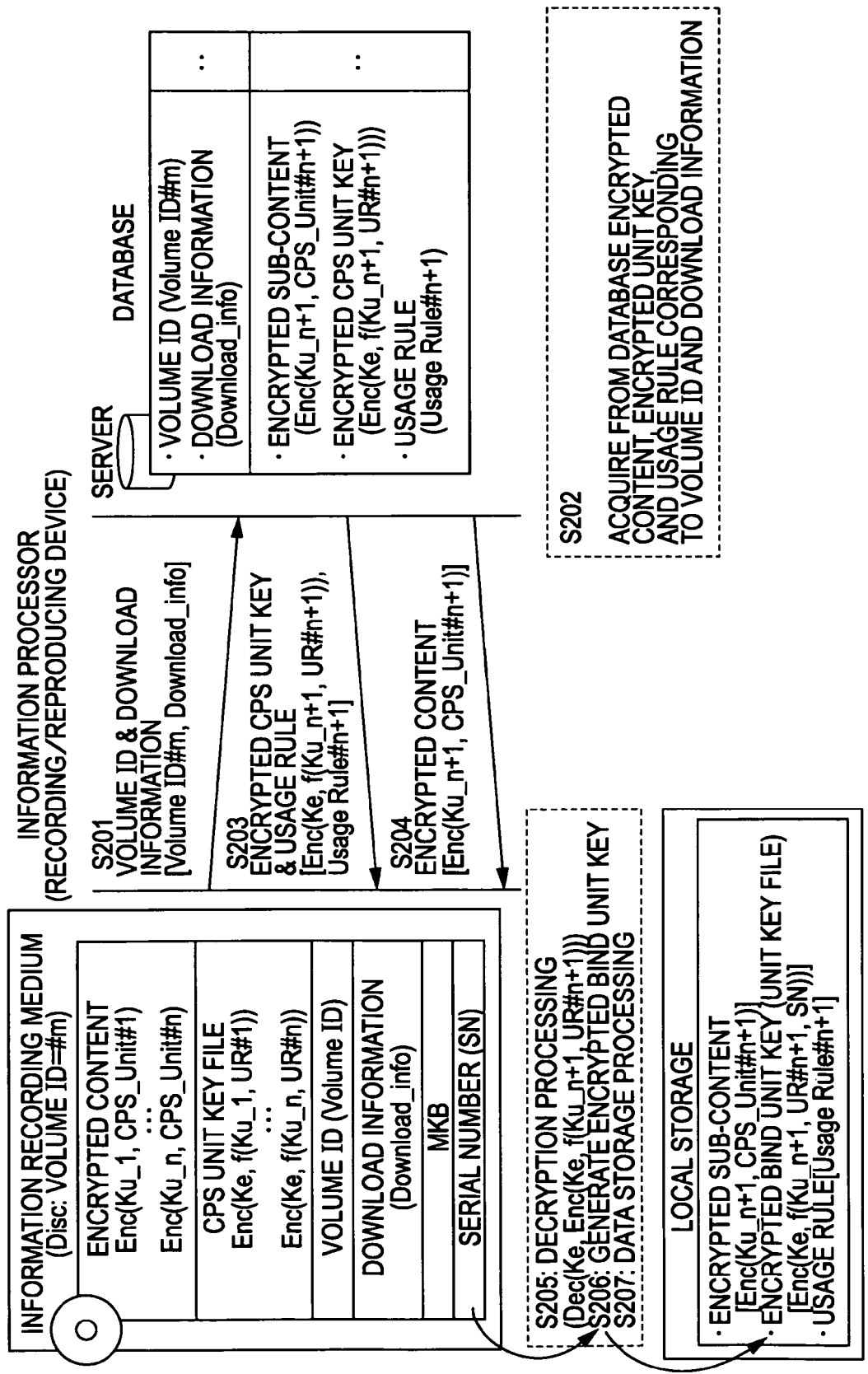
FIG. 11 is a diagram illustrating the processing sequence for acquiring disc-binding type subsequently generated data.

The acquisition processing for disc-bound subsequently generated data will be described with reference to FIG. 11. In FIG. 11, an information processor that acquires subsequently generated data is shown on the left-hand side, and a server that provides the subsequently generated data is shown on the right-hand side.

The information processor executes the acquisition processing for subsequently generated data with the above-described information recording medium storing the content sectioned into the CPS units being loaded in the drive of the information processor. The information recording medium, whose volume ID=#m, stores:

Encrypted contents: Enc(Ku_1, CPS_Unit#1) to Enc (Ku_n, CPS_Unit#n); and

CPS unit key files: Enc(Ke, f(Ku_1, UR#1) to (Ke, f Ku_n, UR#n).

Further, the various kinds of information described with reference to FIG. 1 are recorded on the information recording medium. FIG. 6 shows respective data of the volume ID, download information, MKB, and the like as part of such information.

As described above with reference to FIG. 6, the server that provides subsequently generated data stores, in association with the volume ID and download information:

Encrypted sub-content [Enc(Ku_n+1, CPS_Unit#n+1)] as subsequently generated data;

CPS unit key file [Enc(Ke, f(Ku_n+1, UR#n+1))] created by encrypting a unit key used to decrypt the encrypted sub-content as subsequently generated data; and Usage rules (UR: Usage Rule#n+1) corresponding to the encrypted sub-content as subsequently generated data.

The respective processing of steps S201 to S207 will be described. In step S201, the information processor transmits to the server the volume ID (Volume ID#m) and download information (Download_info) acquired from the information recording medium.

In step S202, the server that has received the volume ID (Volume ID#m) and the download information (Download_info) executes database search, and acquires data stored in association with the volume ID (Volume ID#m) and the download information (Download_info), that is, the server acquires the following respective data:

CPS unit key file [Enc(Ke, f(Ku_n+1, UR#n+1))] created by encrypting a unit key used to decrypt the encrypted sub-content as subsequently generated data;

Usage rules (UR: Usage Rule#n+1) corresponding to the encrypted sub-content as subsequently generated data; and Encrypted sub-content [Enc(Ku_n+1, CPS_Unit#n+1)] as subsequently generated data, and transmits these acquired data to the information processor in steps S203 and S204.

Upon receiving the data transmitted from the server, in step S205, the information processor decrypts, with the volume unique key [Ke], data of the CPS unit key file, that is, the CPS unit key file [Enc(Ke, f(Ku_n+1, UR#n+1))] created by encrypting a unit key used to decrypt the encrypted sub-content. In step S206, the information processor executes the binding processing with a serial number [SN] read from the information recording medium, and decryption processing, thereby generating an encrypted bind unit key [Enc(Ke, f(Ku_n+1, UR#n+1, SN))]. Note that the details of these data processing will be described later with reference to FIG. 12.

In step S207, the data acquired from the server, including:

Encrypted sub-content [Enc(Ku_n+1, CPS_Unit#n+1)] as subsequently generated data; and Usage rules (UR: Usage Rule#n+1) corresponding to the encrypted sub-content as subsequently generated data, and data generated by the information processor on the basis of the CPS unit key file [Enc(Ke, f(Ku_n+1, UR#n+1))] acquired from the server, that is:

Encrypted bind unit key [Enc(Ke, f(Ku_n+1, UR#n+1, SN))], are stored onto the local storage.

(3.2.b) Processing for Recording Disc-Bound Subsequently Generated Data onto the Local Storage Next, referring to FIG. 12, the processing for recording disc-bound subsequently generated data onto the local storage, in particular, the processing sequence for generating the encrypted bind unit key [Enc(Ke, f(Ku_n+1, UR#n+1, SN))] will be described.

Figure 12:
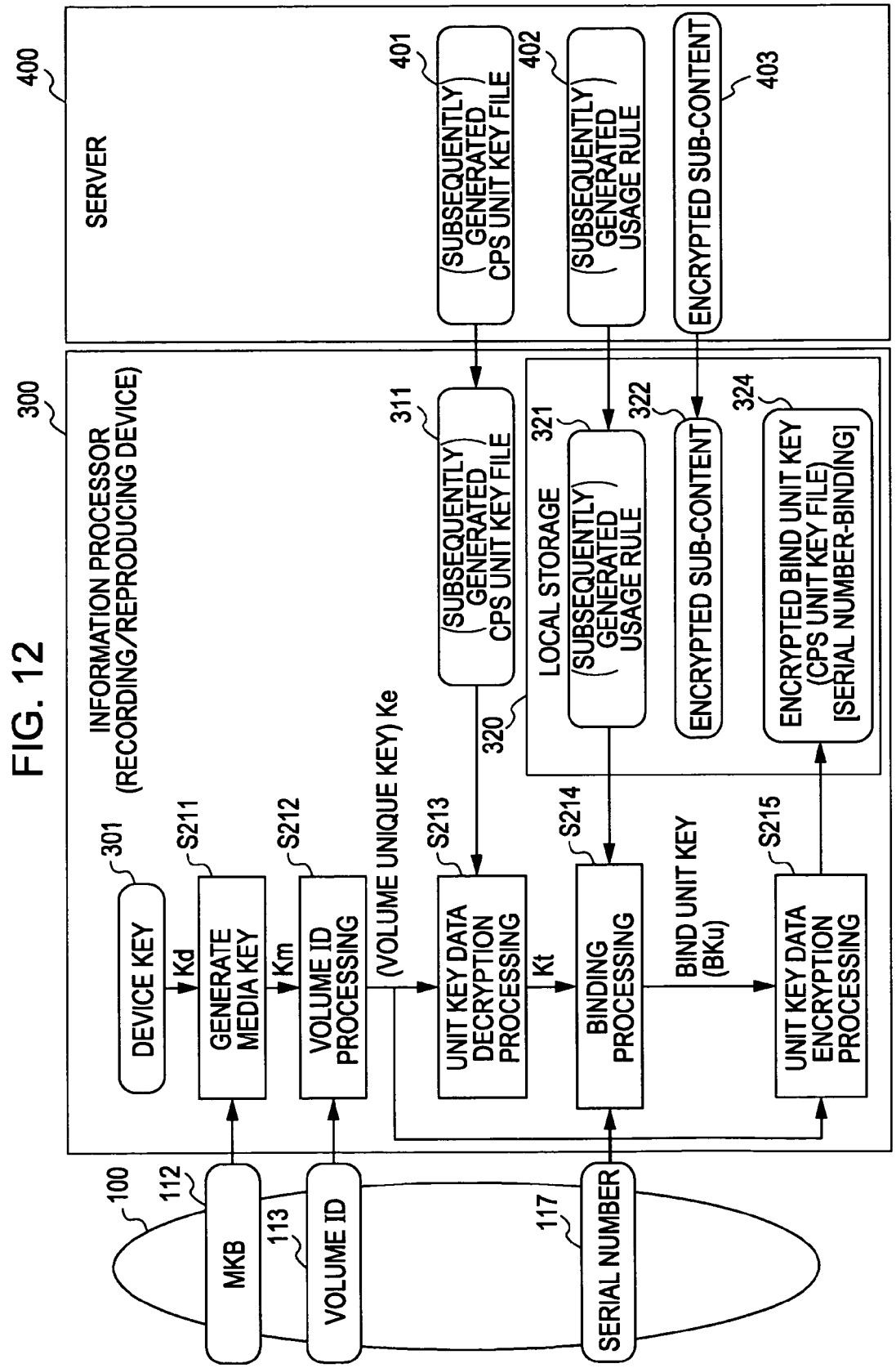
FIG. 12 is a diagram illustrating the processing sequence executed by the information processor when recording the disc-binding type subsequently generated data onto the local storage.

FIG. 12 shows the information processor 300 for acquiring subsequently generated data or the like from a server and storing the acquired data and the processing data with respect to the acquired data onto the local storage 320, the server 400 that provides the subsequently generated data or the like, and the information recording medium 100 loaded into the information processor 300.

Although the information recording medium 100 stores the various kinds of data described above with reference to FIG. 1, in the illustrated example, only the MKB 112 as an encryption key block, the volume ID 113, and the serial number 117 are shown as data to be applied to the processing for recording disc-bound subsequently generated data onto the local storage.

As described above with reference to FIG. 11, the server provides the following data to the information processor 300:

Encrypted sub-content [Enc(Ku_n+1, CPS_Unit#n+1)] 403 as subsequently generated data;

CPS unit key file [Enc(Ke, f(Ku_n+1, UR#n+1))] 401 created by encrypting a unit key used to decrypt the encrypted sub-content 403 as subsequently generated data; and Usage rules (UR: Usage Rule#n+1) 402 corresponding to the encrypted sub-content 403 as subsequently generated data.

The processing of the information processor 300 will be described. First, the information processor 300 reads the device key [Kd] 301 stored in the memory. The device key 301 is a secret key stored on an information processor that has received a license on content usage.

Next, in step S211, the information processor 300 acquires the media key Km by executing, with the device key 301, the decryption processing of the MKB 112 that is an encryption key block storing the media key Km which is stored on the information recording medium 100.

Next, in step S212, the volume unique key Ke (embedded Key) is generated through encryption processing based on the media key Km acquired by the MKB processing in step S221, and the volume ID 113 read from the information recording medium 100. This key generation processing is executed as processing in accordance with, for example, the AES encryption algorithm described above with reference to FIG. 8.

Next, in step S213, using the volume key Ke, the decryption processing of the CPS unit key file [Enc(Ke, f(Ku_n+1, UR#n+1))] 311 (=401) acquired from the server is executed. Through this decryption processing, Data [Kt]=f(Ku_n+1, UR#n+1)

is acquired from:

CPS unit key file [Enc(Ke, f(Ku_n+1, UR#n+1))].

Next, in step S214, bind unit key (BKu) data is generated by executing computation processing to which the serial number [SN] read from the information recording medium 100 and the usage rules (UR: Usage Rule#n+1) 321 (=402) corresponding to the subsequently generated data acquired from the server are applied. The bind unit key (BKu) is the following data.

BKu=f(Ku_n+1, UR#n+1, SN)

The bind unit key: BKu=f(Ku_n+1, UR#n+1, SN) is computation result data of exclusive OR operation or the like between the unit key [Ku_n+1] corresponding to the CPS unit #n+1, the usage rules [UR#n+1], and the serial number [SN].

Further, in step S215, the encryption processing of the bind unit key: BKu=f(Ku_n+1, UR#n+1, SN) is executed with the volume unique key Ke calculated in step S212, and an encrypted bind unit key [Enc(Ke, f(Ku_n+1, UR#n+1, SN))] is generated and stored onto the local storage 320.

Note that the local storage 320 stores:

Encrypted bind unit key [Enc(Ke, f(Ku_n+1, UR#n+1, SN))] 324, which is generated by the above-described processing; and the following data acquired from the server 400:

Encrypted sub-content [Enc(Ku_n+1, CPS_Unit#n+1)] 322 (=403) as subsequently generated data; and Usage rules (UR: Usage Rule#n+1) 321 (=402) corresponding to the encrypted sub-content 322 as subsequently generated data.

Figure 13:
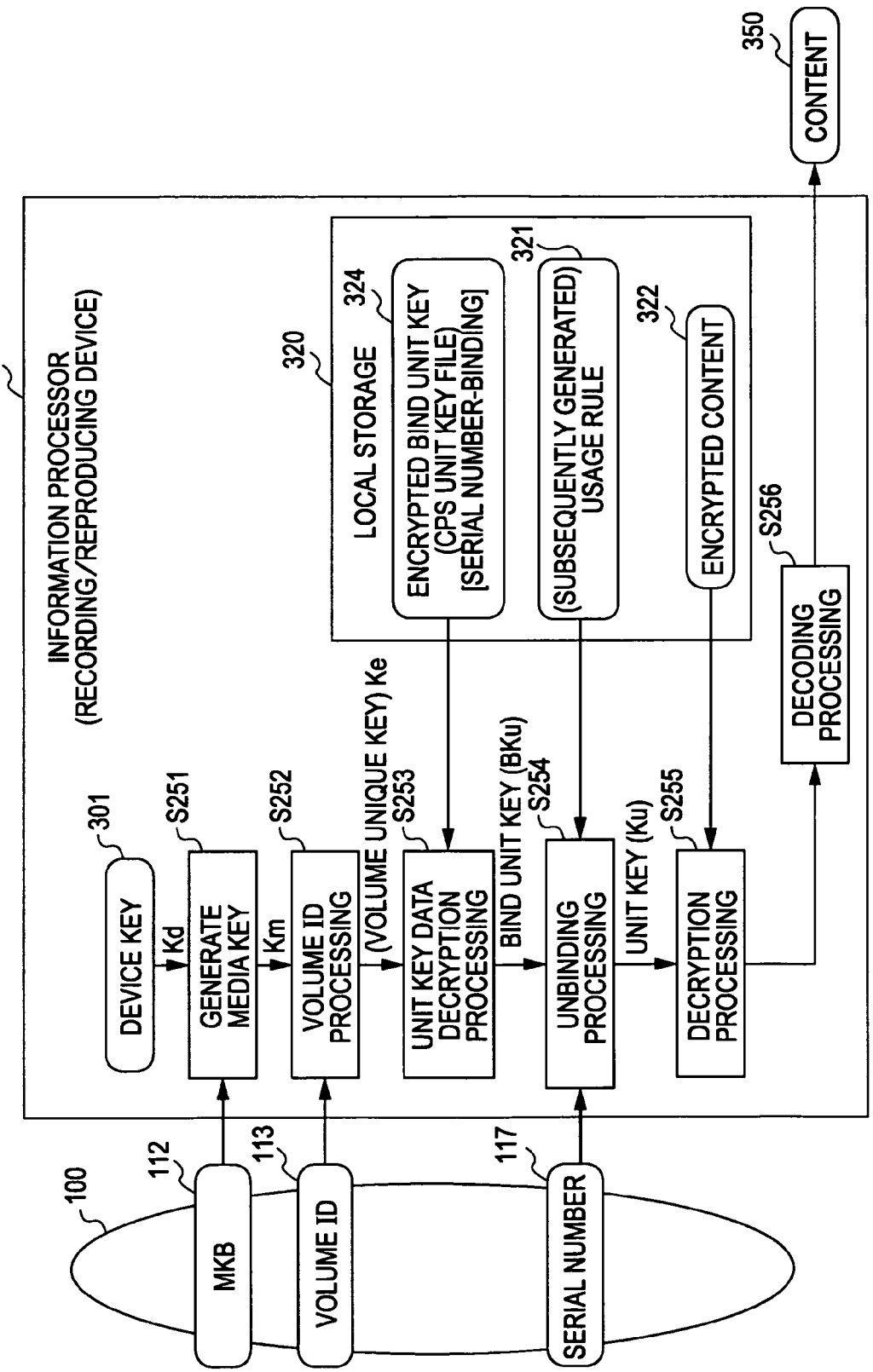
FIG. 13 is a diagram illustrating the processing sequence for reproducing the disc-binding type subsequently generated data.

(3.2.c) Processing for Decrypting and Using Disc-Bound Subsequently Generated Data Recorded on the Local Storage Next, the processing for using disc-bound subsequently generated data recorded on the local storage will be described with reference to FIG. 13. It is assumed that the local storage 320 stores the following data as the data stored through the processing described above with reference to FIGS. 11 and 12:

Encrypted sub-content [Enc(Ku_n+1, CPS_Unit#n+1)] 322 as subsequently generated data;

Usage rules (UR: Usage Rule#n+1) 321 (=402) corresponding to the encrypted sub-content 322 as subsequently generated data; and Encrypted bind unit key [Enc(Ke, f(Ku_n+1, UR#n+1, SN))] 324.

First, the information processor 300 reads the device key [Kd] 301 stored in the memory. The device key 301 is a secret key stored in an information processor that has received a license on content usage.

Next, in step S251, the information processor 300 acquires the media key Km by executing, with the device key 301, the decryption processing of the MKB 112 as an encryption key block storing the media key Km which is stored on the information recording medium 100.

Next, in step S252, the volume unique key Ke is generated through encryption processing based on the media key Km acquired by the MKB processing in step S251, and the volume ID 113 read from the information recording medium 100. This key generation processing is executed as processing in accordance with, for example, the AES encryption algorithm described above with reference to FIG. 8.

Next, in step S253, using the volume unique key Ke, the decryption processing of the encrypted bind unit key [Enc(Ke, f(Ku_n+1, UR#n+1, SN))] 324 read from the local storage 320 is executed.

Through the decryption processing of the encrypted bind unit key [Enc(Ke, f(Ku_n+1, UR#n+1, SN))] 324 in step S253, Bind unit key [BKu]=f(Ku_n+1, UR#n+1, SN)

is acquired, and in step S254, with respect to:

Bind unit key [BKu]=f(Ku_n+1, UR#n+1, SN), computation processing, to which the usage rules (UR: Usage Rule#n+1) 321 read from the local storage 320 and the serial number [SN] read from the information recording medium 100 are applied, is executed, thereby obtaining the unit key [Ku_n+1].

When, for instance, the bind unit key [BKu]=f(Ku_n+1, UR#n+1, SN) is exclusive OR (XOR) data between the unit key [Ku_n+1], the usage rules (UR#n+1), and the serial number [SN], the unit key [Ku_n+1] can be acquired by executing an exclusive OR (XOR) operation between the usage rules (UR: Usage Rule#n+1) 321 read from the local storage 320 and the serial number [SN] read from the information recording medium 100, again with respect to the bind unit key [BKu].

Next, in step S255, with respect to the encrypted sub-content [Enc(Ku_n+1, CPS_Unit#n+1)] 322 read from the local storage 320, decryption processing (for example, AES_D) with the unit key [Ku_n+1] is executed. In step S256, necessary decoding processing, such as MPEG decoding, compression/decompression, or descrambling, is executed to acquire the content 350.

Through this processing, the encrypted sub-content [Enc(Ku_n+1, CPS_Unit#n+1)] 322 as the subsequently generated data stored on the local storage 320 can be decrypted for use, that is, for reproduction.

In this way, as for the disc-bound subsequently generated data, when storing the subsequently generated data acquired from the server onto the local storage, as described above with reference to FIG. 12, the CPS unit key and the serial number [SN] are bound together through the processing of the CPS unit key file received from the server, and encrypted and stored onto the local storage in the form of an encrypted bind unit key; to use the subsequently generated data, as described above with reference to FIG. 13, it is necessary to perform processing using the serial number [SN] in order to acquire the unit key from the encrypted bind unit key stored on the local storage.

The requisite condition for the unbinding and unit key acquisition is that the serial number [SN] used when reproducing subsequently generated data be the same serial number [SN] used when recording the subsequently generated data. Accordingly, as described above, the disc-bound subsequently generated data is subsequently generated data whose use is permitted only when the information processor is loaded with a disc having the same serial number as that of the information recording medium (disc) used when acquiring (downloading) the subsequently generated data.

[(3.3) Details of the Processing for Acquiring, Recording, and Using Package-Bound Subsequently Generated Data]

Next, the processing for acquiring, recording, and using package-bound subsequently generated data will be described in detail. As described above, the package-bound subsequently generated data is a type of subsequently generated data whose use is permitted only when the information processor is loaded with an information recording medium (disc) having the same package ID as that of the information recording medium (disc) used when acquiring (downloading) the subsequently generated data.

(3.3.a) Acquisition Processing for Package-Bound Subsequently Generated Data

Figure 14:
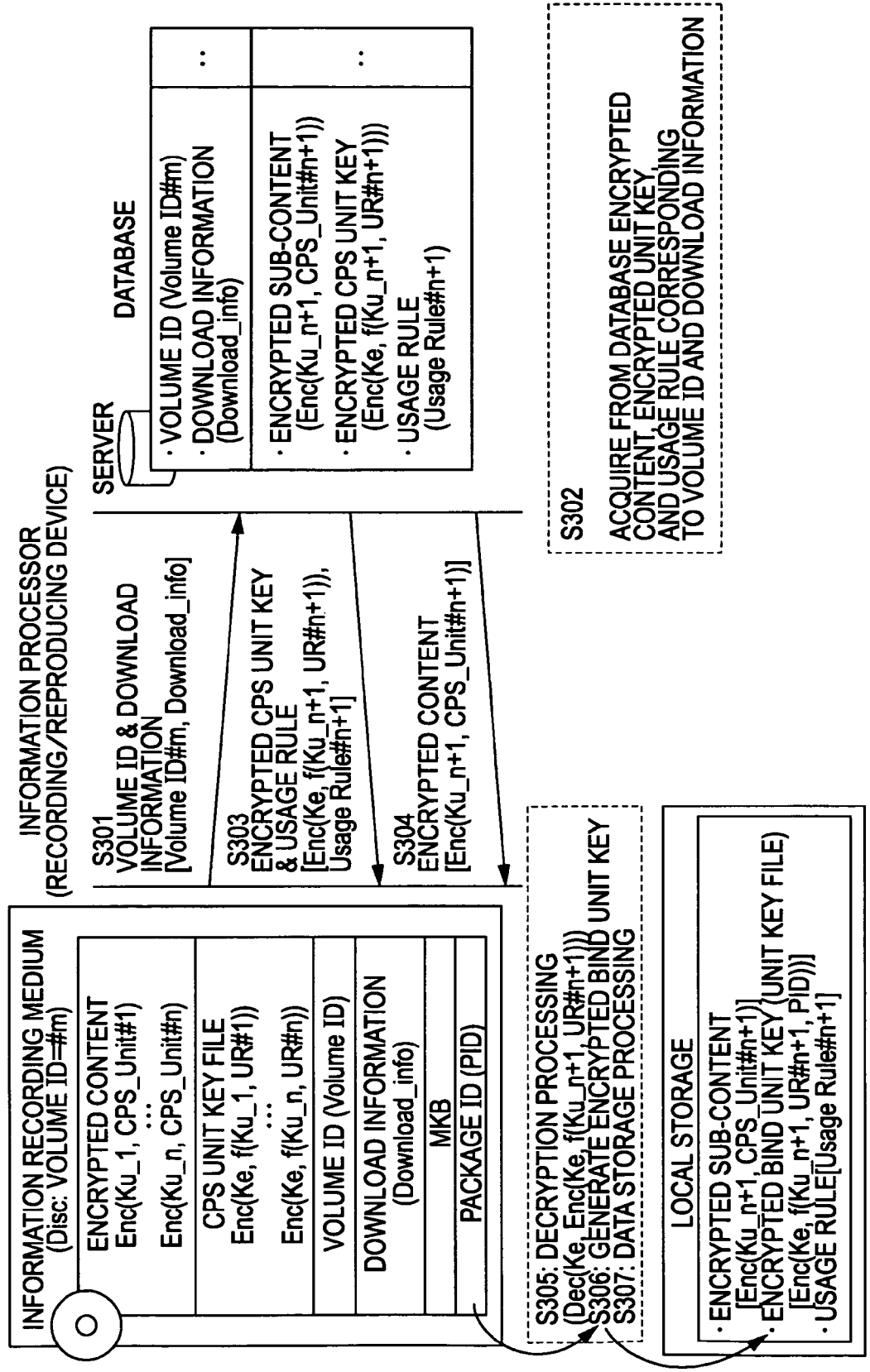
FIG. 14 is a diagram illustrating the processing sequence for acquiring package-binding type subsequently generated data.

The acquisition processing for package-bound subsequently generated data will be described with reference to FIG. 14. In FIG. 14, an information processor that acquires subsequently generated data is shown on the left-hand side, and a server that provides the subsequently generated data is shown on the right-hand side.

The information processor executes the acquisition processing for subsequently generated data with the above-described information recording medium storing the content sectioned into the CPS units being loaded in the drive of the information processor. The information recording medium, whose volume ID=#m, stores:

Encrypted contents: Enc(Ku_1, CPS_Unit#1) to Enc(Ku_n, CPS_Unit#n); and

CPS unit key files: Enc(Ke, f(Ku_1, UR#1) to (Ke, fKu_n, UR#n).

Further, the various kinds of information described with reference to FIG. 1 are recorded on the information recording medium. FIG. 6 shows respective data of the volume ID, download information, MKB, package ID [PID], and the like as part of such information.

As described above with reference to FIG. 6, the server that provides subsequently generated data stores, in association with the volume ID and download information:

Encrypted sub-content [Enc(Ku_n+1, CPS_Unit#n+1)] as subsequently generated data;

CPS unit key file [Enc(Ke, f(Ku_n+1, UR#n+1))] created by encrypting a unit key used to decrypt the encrypted sub-content as subsequently generated data; and Usage rules (UR: Usage Rule#n+1) corresponding to the encrypted sub-content as subsequently generated data.

The respective processing of steps S301 to S307 will be described. In step S301, the information processor transmits to the server the volume ID (Volume ID#m) and download information (Download_info) acquired from the information recording medium.

In step S302, the server that has received the volume ID (Volume ID#m) and the download information (Download_info) executes database search, and acquires data stored in association with the volume ID (Volume ID#m) and the download information (Download_info), that is, the server acquires the following respective data:

CPS unit key file [Enc(Ke, f(Ku_n+1, UR#n+1))] created by encrypting a unit key used to decrypt the encrypted sub-content as subsequently generated data;

Usage rules (UR: Usage Rule#n+1) corresponding to the encrypted sub-content as subsequently generated data; and Encrypted sub-content [Enc(Ku_n+1, CPS_Unit#n+1)] as subsequently generated data, and transmits these acquired data to the information processor in steps S303 and S304.

Upon receiving the data transmitted from the server, in step S305, the information processor decrypts, with the volume unique key [Ke], data of the CPS unit key file, that is, the CPS unit key file [Enc(Ke, f(Ku_n+1, UR#n+1))] created by encrypting a unit key used to decrypt the encrypted sub-content. In step S306, the information processor executes the binding processing with the package ID [PID] read from the information recording medium, and decryption processing, thereby generating an encrypted bind unit key [Enc(Ke, f(Ku_n+1, UR#n+1, PID))]. Note that the details of these data processing will be described later with reference to FIG. 15.

In step S307, the data acquired from the server, including:

Encrypted sub-content [Enc(Ku_n+1, CPS_Unit#n+1)] as subsequently generated data; and Usage rules (UR: Usage Rule#n+1) corresponding to the encrypted sub-content as subsequently generated data, and data generated by the information processor on the basis of the CPS unit key file [Enc(Ke, f(Ku_n+1, UR#n+1))] acquired from the server, that is:

Encrypted bind unit key [Enc(Ke, f(Ku_n+1, UR#n+1, PID))], are stored onto the local storage.

(3.3.b) Processing for Recording Package-Bound Subsequently Generated Data onto the Local Storage Next, referring to FIG. 15, the processing for recording package-bound subsequently generated data onto the local storage, in particular, the processing sequence for generating the encrypted bind unit key [Enc(Ke, f(Ku_n+1, UR#n+1, PID))] will be described.

Figure 15:
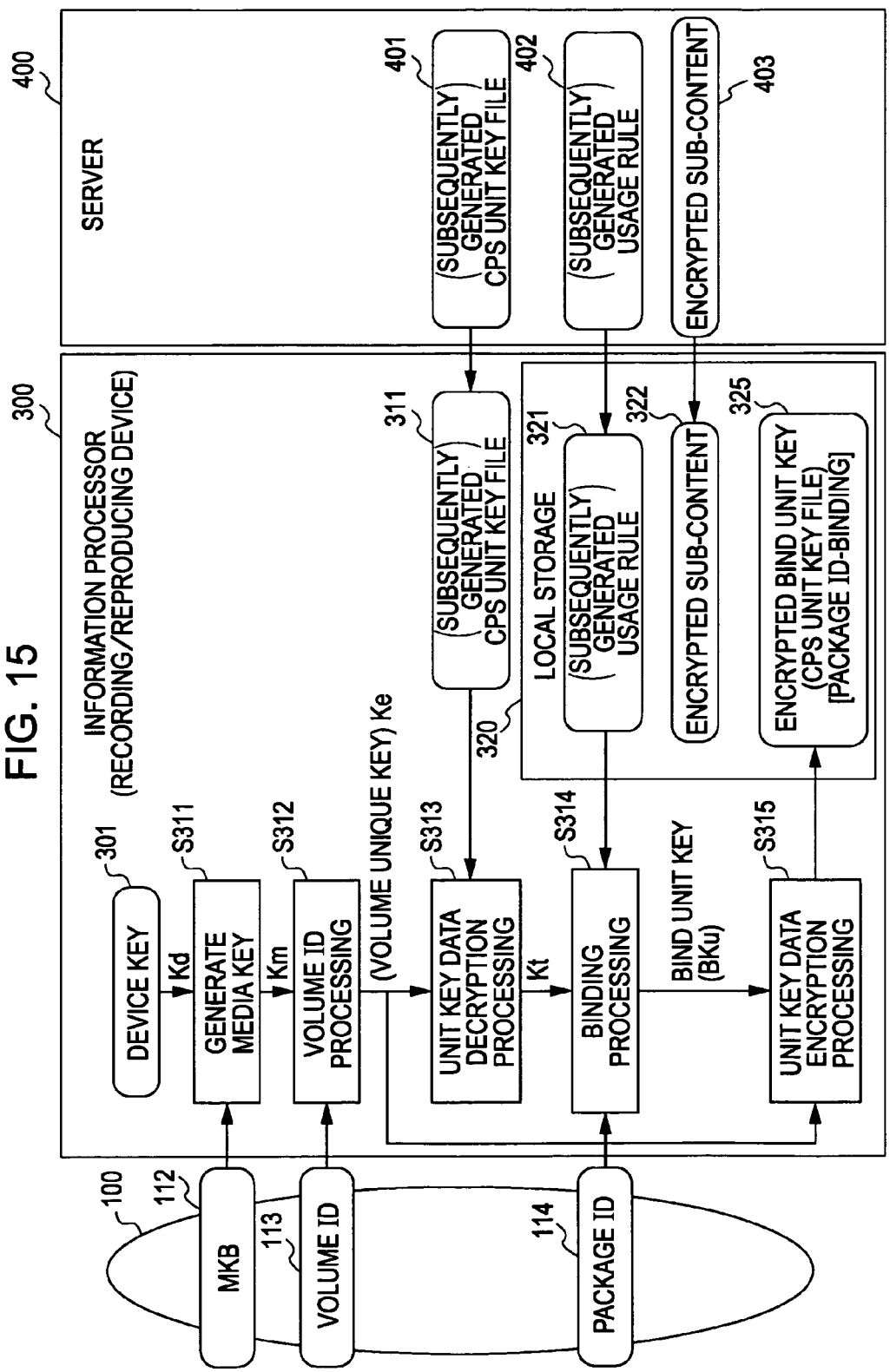
FIG. 15 is a diagram illustrating the processing sequence executed by the information processor when recording the package-binding type subsequently generated data onto the local storage.

FIG. 15 shows the information processor 300 for acquiring subsequently generated data or the like from a server and storing the acquired data and the processing data with respect to the acquired data onto the local storage 320, the server 400 that provides the subsequently generated data or the like, and the information recording medium 100 loaded into the information processor 300.

Although the information recording medium 100 stores the various kinds of data described above with reference to FIG. 1, in the illustrated example, only the MKB 112 as an encryption key block, the volume ID 113, and the package ID 114 are shown as data to be applied to the processing for recording disc-bound subsequently generated data onto the local storage.

As described above with reference to FIG. 14, the server provides the following data to the information processor 300:

Encrypted sub-content [Enc(Ku_n+1, CPS_Unit#n+1)] 403 as subsequently generated data;

CPS unit key file [Enc(Ke, f(Ku_n+1, UR#n+1))] 401 created by encrypting a unit key used to decrypt the encrypted sub-content 403 as subsequently generated data; and Usage rules (UR: Usage Rule#n+1) 402 corresponding to the encrypted sub-content 403 as subsequently generated data.

The processing of the information processor 300 will be described. First, the information processor 300 reads a device key [Kd] 301 stored in the memory. The device key 301 is a secret key stored on an information processor that has received a license on content usage.

Next, in step S311, the information processor 300 acquires the media key Km by executing, with the device key 301, the decryption processing of the MKB 112 that is an encryption key block storing the media key Km which is stored on the information recording medium 100.

Next, in step S312, the volume unique key Ke (embedded Key) is generated through encryption processing based on the media key Km acquired by the MKB processing in step S311, and the volume ID 113 read from the information recording medium 100. This key generation processing is executed as processing in accordance with, for example, the AES encryption algorithm described above with reference to FIG. 8.

Next, in step S313, using the volume unique key Ke, the decryption processing of the CPS unit key file [Enc(Ke, f(Ku_n+1, UR#n+1))] 311 (=401) acquired from the server is executed. Through this decryption processing, Data [Kt]=f(Ku_n+1, UR#n+1)

is acquired from:

CPS unit key file [Enc(Ke, f(Ku_n+1, UR#n+1))].

Next, in step S314, bind unit key (BKu) data is generated by executing computation processing to which the package ID [PID] read from the information recording medium 100 and the usage rules (UR: Usage Rule#n+1) 321 (=402) corresponding to the subsequently generated data acquired from the server are applied. The bind unit key (BKu) is the following data.

BKu=f(Ku_n+1, UR#n+1, PID)

The bind unit key: BKu=f(Ku_n+1, UR#n+1, PID) is computation result data of exclusive OR operation or the like between the unit key [Ku_n+1] corresponding to the CPS unit #n+1, the usage rules [UR#n+1], and the package ID [PID].

Further, in step S315, the encryption processing of the bind unit key: BKu=f(Ku_n+1, UR#n+1, PID) is executed with the volume unique key Ke calculated in step S312, and an encrypted bind unit key [Enc(Ke, f(Ku_n+1, UR#n+1, PID))] is generated and stored onto the local storage 320.

Note that the local storage 320 stores:

Encrypted bind unit key [Enc(Ke, f(Ku_n+1, UR#n+1, PID))] 325 generated by the above-described processing; and the following data acquired from the server 400:

Encrypted sub-content [Enc(Ku_n+1, CPS_Unit#n+1)] 322 (=403) as subsequently generated data; and Usage rules (UR: Usage Rule#n+1) 321 (=402) corresponding to the encrypted sub-content 322 as subsequently generated data.

Figure 16:
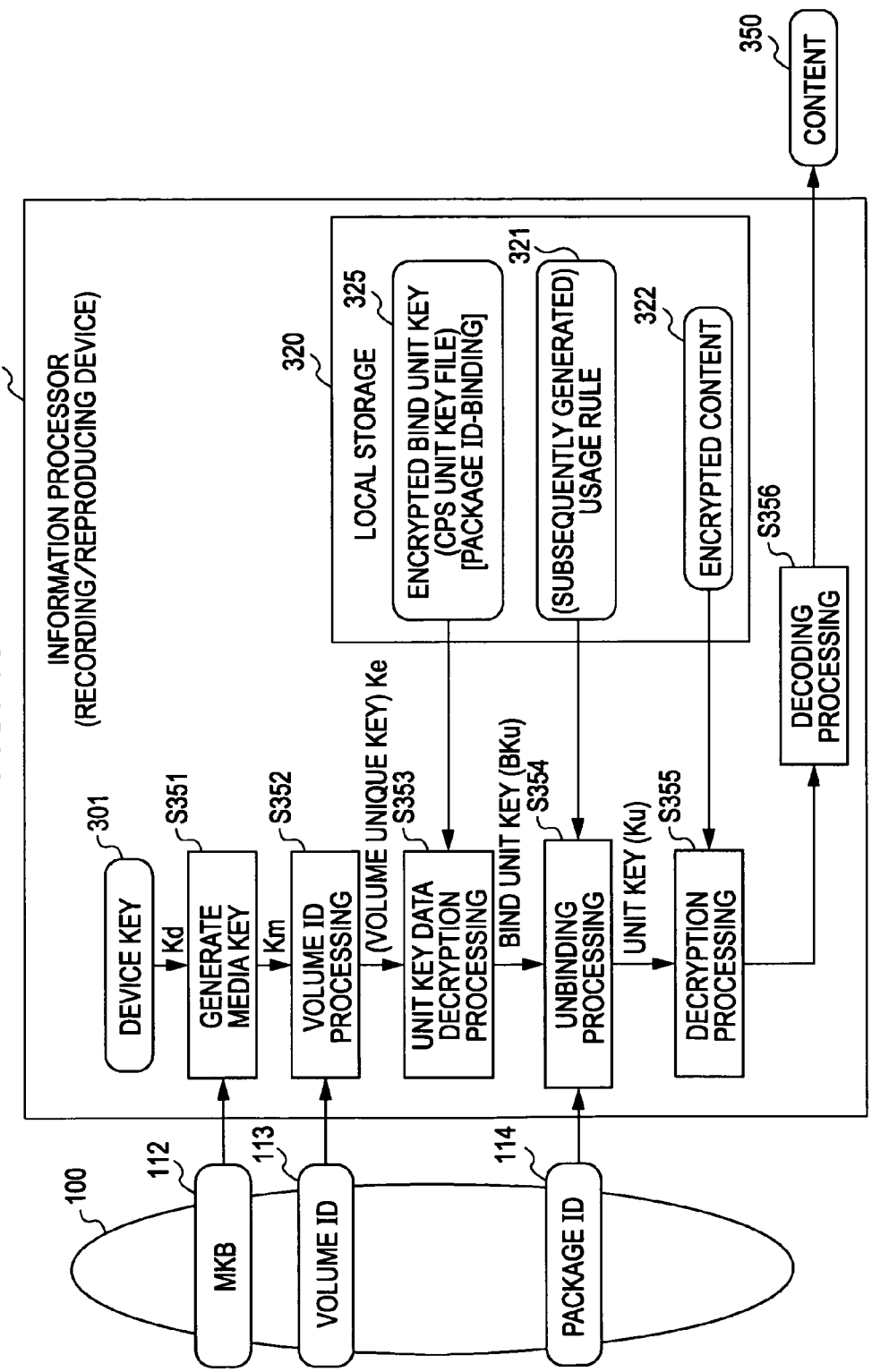
FIG. 16 is a diagram illustrating the processing sequence for reproducing the package-binding type subsequently generated data.

(3.3.c) Processing for Decrypting and Using Package-Bound Subsequently Generated Data Recorded on the Local Storage Next, the processing for using package-bound subsequently generated data recorded on the local storage will be described with reference to FIG. 16. It is assumed that the local storage 320 stores the following data as the data stored through the processing described above with reference to FIGS. 14 and 15:

Encrypted sub-content [Enc(Ku_n+1, CPS_Unit#n+1)] 322 as subsequently generated data;

Usage rules (UR: Usage Rule#n+1) 321 (=402) corresponding to the encrypted sub-content 322 as subsequently generated data; and Encrypted bind unit key [Enc(Ke, f(Ku_n+1, UR#n+1, PID))] 325.

First, the information processor 300 reads the device key [Kd] 301 stored in the memory. The device key 301 is a secret key stored in an information processor that has received a license on content usage.

Next, in step S351, the information processor 300 acquires the media key Km by executing, with the device key 301, the decryption processing of the MKB 112 as an encryption key block storing the media key Km which is stored on the information recording medium 100.

Next, in step S352, the volume unique key Ke is generated through encryption processing based on the media key Km acquired by the MKB processing in step S351, and the volume ID 113 read from the information recording medium 100. This key generation processing is executed as processing in accordance with, for example, the AES encryption algorithm described above with reference to FIG. 8.

Next, in step S353, using the volume unique key Ke, the decryption processing of the encrypted bind unit key [Enc (Ke, f(Ku_n+1, UR#n+1, PID))] 325 read from the local storage 320 is executed.

Through the decryption processing of the encrypted bind unit key [Enc(Ke, f(Ku_n+1, UR#n+1, PID))] 325 in step S353, Bind unit key [BKu]=f(Ku_n+1, UR#n+1, PID)

is acquired, and in step S354, with respect to:

Bind unit key [BKu]=f(Ku_n+1, UR#n+1, PID), computation processing, to which the usage rules (UR: Usage Rule#n+1) 321 read from the local storage 320 and the package ID [PID] read from the information recording medium 100 are applied, is executed, thereby obtaining the unit key [Ku_n+1]. When, for instance, the bind unit key [BKu]=f(Ku_n+1, UR#n+1, PID) is exclusive OR (XOR) data between the unit key [Ku_n+1], the usage rules (UR#n+ 1), and the package ID [PID], the unit key [Ku_n+1] can be acquired by executing an exclusive OR (XOR) operation between the usage rules (UR: Usage Rule#n+1) 321 read from the local storage 320 and the package ID [PID] read from the information recording medium 100, again with respect to the bind unit key [BKu].

Next, in step S355, with respect to the encrypted sub-content [Enc(Ku_n+1, CPS_Unit#n+1)] 322 read from the local storage 320, decryption processing (for example, AES_D) with the unit key [Ku_n+1] is executed. In step S356, necessary decoding processing, such as MPEG decoding, compression/decompression, or descrambling, is executed to acquire the content 350.

Through this processing, the encrypted sub-content [Enc (Ku_n+1, CPS_Unit#n+1)] 322 as the subsequently generated data stored in the local storage 320 can be decrypted for use, that is, for reproduction.

In this way, as for the package-bound subsequently generated data, when storing the subsequently generated data acquired from the server onto the local storage, as described above with reference to FIG. 15, the CPS unit key and the package ID [PID] are bound together through the processing of the CPS unit key file received from the server, and encrypted and stored onto the local storage in the form of an encrypted bind unit key; to use the subsequently generated data, as described above with reference to FIG. 16, it is necessary to perform processing using the package ID [PID] in order to acquire the unit key from the encrypted bind unit key stored on the local storage.

The requisite condition for the unbinding and unit key acquisition is that the package ID [PID] used when reproducing subsequently generated data be the same package ID [PID] used when recording the subsequently generated data. Accordingly, as described above, the package-bound subsequently generated data is subsequently generated data whose use is permitted only when the information processor is loaded with a disc having the same serial number as that of the information recording medium (disc) used when acquiring (downloading) the subsequently generated data. While in this example the subsequently generated data is bound to the package ID, the subsequently generated data may be bound to the Volume ID.

[(3.4) Details of the Processing for Acquiring, Recording, and Using Subsequently Generated Data when the CPS Unit Key Corresponding to the Subsequently Generated Data is Pre-Stored on the Information Recording Medium]

Next, description will be given in detail of the processing for acquiring, recording, and using subsequently generated data when the CPS unit key corresponding to the subsequently generated data is pre-stored on the information recording medium. There are cases where, when acquiring subsequently generated data, the CPS unit key or usage rules (UR) corresponding to the subsequently generated data is pre-stored on the information recording medium. In this case, there is no need to acquire the CPS unit key file or usage rules (UR) from the server. The details of the processing for acquiring, recording, and using subsequently generated data in this case will be described.

(3.4.a) Acquisition Processing for Subsequently Generated Data

Figure 17:
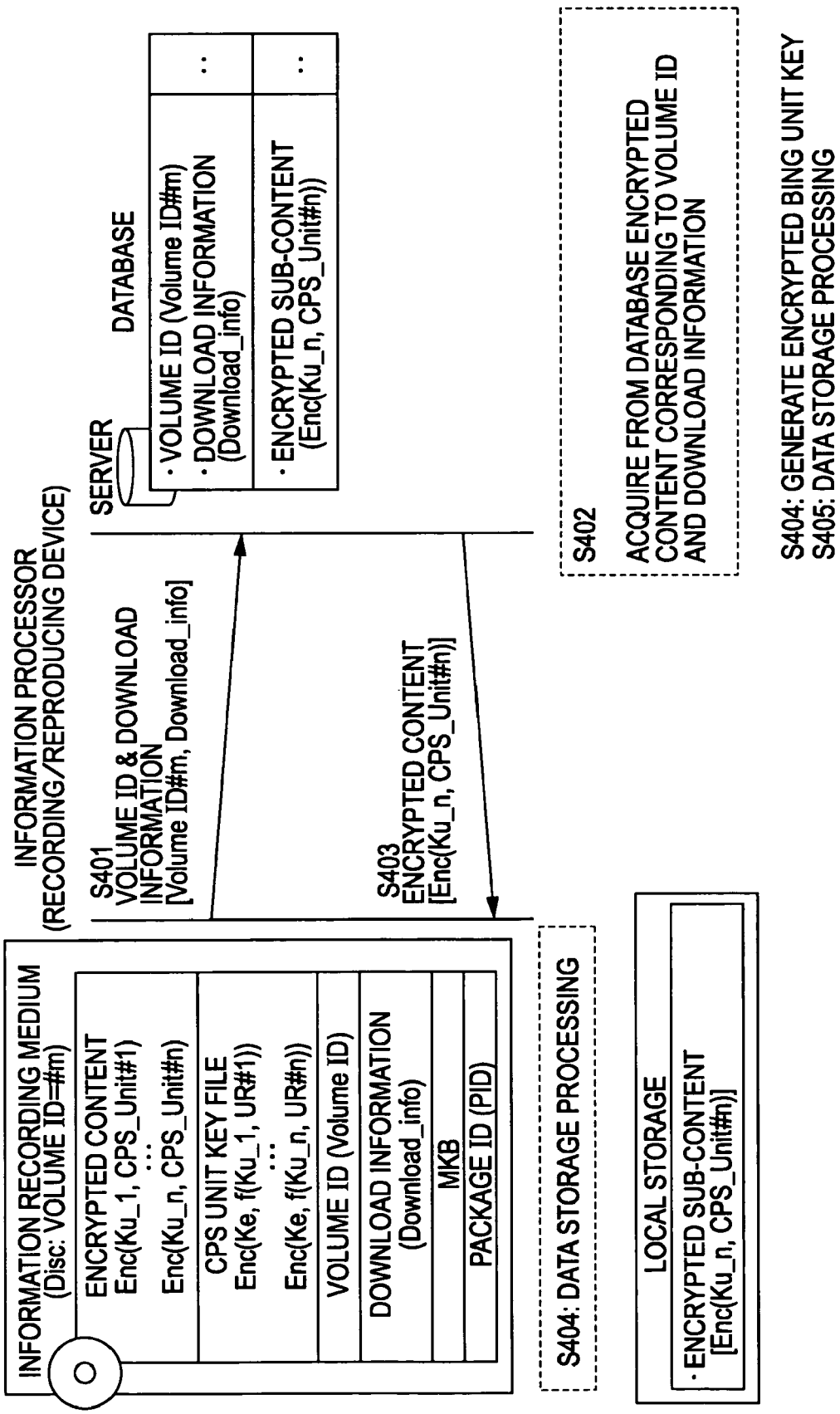
FIG. 17 is a diagram illustrating the processing sequence for acquiring subsequently generated data to which a CPS unit key stored on the information recording medium can be applied.

Referring to FIG. 17, description will be given of the acquisition processing for subsequently generated data when the CPS unit key corresponding to the subsequently generated data is pre-stored on the information recording medium. In FIG. 17, an information processor that acquires subsequently generated data is shown on the left-hand side, and a server that provides the subsequently generated data is shown on the right-hand side.

The information processor executes the acquisition processing for subsequently generated data with the above-described information recording medium storing the content sectioned into the CPS units being loaded in the drive of the information processor. The information recording medium, whose volume ID=#m, stores:

Encrypted contents: Enc(Ku__1, CPS_Unit#1) to Enc (Ku_n, CPS_Unit#n); and

CPS unit key files: Enc(Ke, f(Ku__1, UR#1) to (Ke, f Ku_n, UR#n).

Further, the various kinds of information described with reference to FIG. 1 are recorded on the information recording medium. FIG. 6 shows respective data of the volume ID, download information, MKB, package ID [PID], and the like as part of such information.

The server that provides subsequently generated data stores, in association with the volume ID and download information:

Encrypted sub-content [Enc(Ku_n+1, CPS_Unit#n')] as subsequently generated data. Encrypted sub-content [Enc(Ku_n+1, CPS_Unit#n')] is data encrypted with the CPS unit key [Ku_n] stored on the information recording medium 100.

The respective processing of steps S401 to S404 will be described. In step S401, the information processor transmits to the server the volume ID (Volume ID#m) and download information (Download_info) acquired from the information recording medium.

In step S402, the server that has received the volume ID (Volume ID#m) and the download information (Download_info) executes database search, and acquires data stored in association with the volume ID (Volume ID#m) and the download information (Download_info), that is:

Encrypted sub-content [Enc(Ku_n+1, CPS_Unit#n')] as subsequently generated data, and transmits the data to the information processor in step S403.

Upon receiving the data transmitted from the server, in step S404, the information processor stores the data acquired from the server, that is:

Encrypted sub-content [Enc(Ku_n+1, CPS_Unit#n')] as subsequently generated data, and stores the data onto the local storage.

(3.4.b) Processing for Decrypting and Using Subsequently Generated Data

Figure 18:
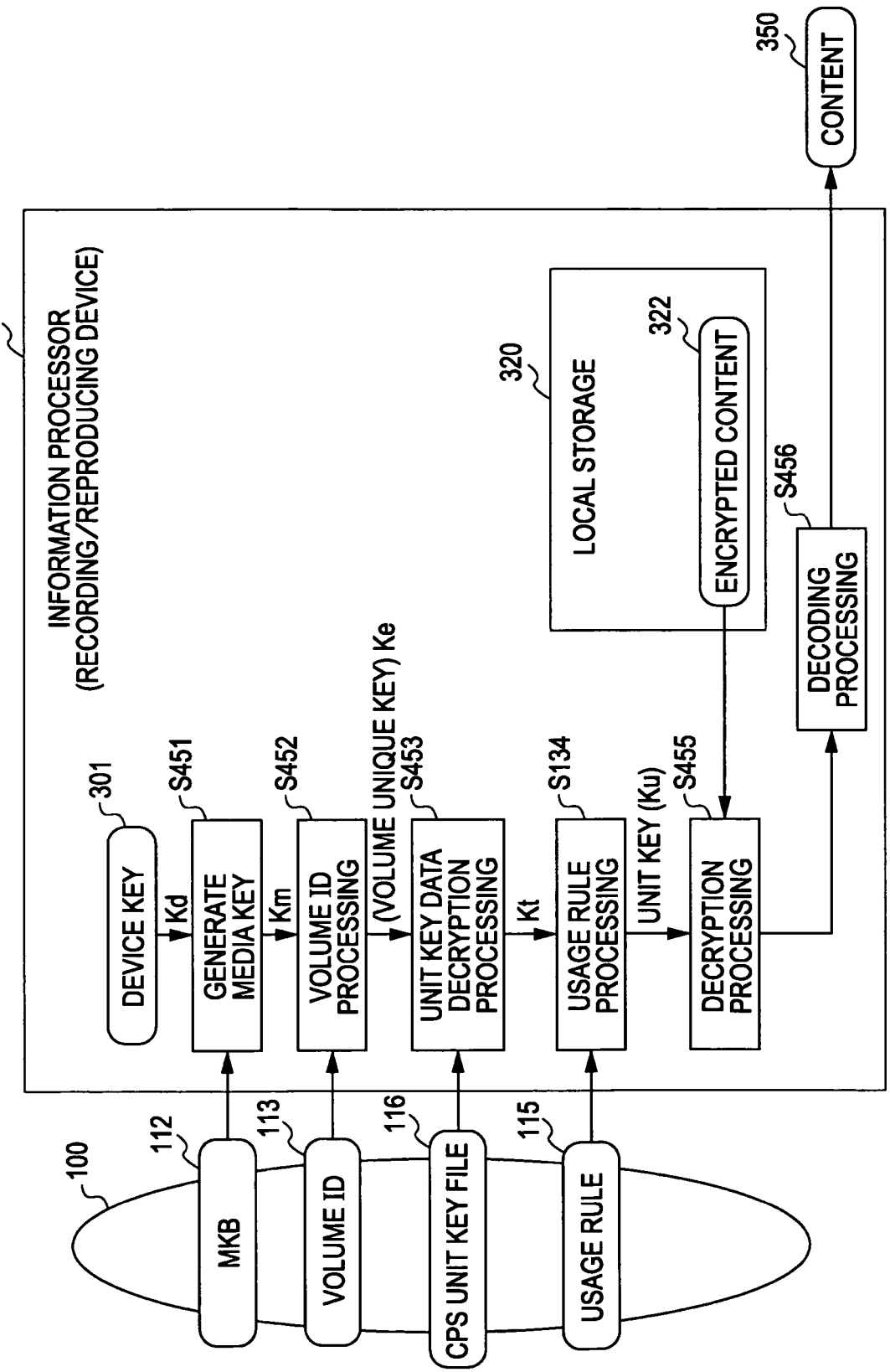
FIG. 18 is a diagram illustrating the processing sequence for reproducing subsequently generated data to which a CPS unit key stored on the information recording medium can be applied.

Next, referring to FIG. 18, description will be given of the processing for using subsequently generated data stored on the local storage when the CPS unit key corresponding to the subsequently generated data is pre-stored on the information recording medium. It is assumed that the local storage 320 stores, as the data stored through the processing described above with reference to FIG. 17:

Encrypted sub-content [Enc(Ku_n+1, CPS_Unit#n')] 322 as subsequently generated data.

First, the information processor 300 reads the device key [Kd] 301 stored in the memory. The device key 301 is a secret key stored in an information processor that has received a license on content usage.

Next, in step S451, the information processor 300 acquires the media key Km by executing, with the device key 301, the decryption processing of the MKB 112 as an encryption key block storing the media key Km which is stored on the information recording medium 100.

Next, in step S452, the volume unique key Ke is generated through encryption processing based on the media key Km acquired by the MKB processing in step S451, and the volume ID 113 read from the information recording medium 100. This key generation processing is executed as processing in accordance with, for example, the AES encryption algorithm described above with reference to FIG. 8.

Next, in step S453, with the volume unique key Ke, the decryption processing of the CPS unit key file [Enc(Ke, f(Ku_n+1, UR#n))] 116 read from the information recording medium 100 is executed, thereby acquiring:

Data [t]=f(Ku_n+1, UR#n).

Next, in step S454, with respect to:

Data [t]=f(Ku_n+1, UR#n), computation processing to which the usage rules (UR: Usage Rule#n) 115 read from the information recording medium 100 are applied is executed, thereby obtaining the unit key [Ku_n].

Next, in step S455, with respect to the encrypted sub-content [Enc(Ku_n+1, CPS_Unit#n')] 322 read from the local storage 320, decryption processing (for example, AES_D) with the unit key [Ku_n] is executed. In step S456, necessary decoding processing, such as MPEG decoding, compression/decompression, or descrambling, is executed to acquire the content 350.

Through this processing, the encrypted sub-content [Enc(Ku_n+1, CPS_Unit#n')] 322 as the subsequently generated data stored in the local storage 320 can be decrypted for use, that is, for reproduction.

In this way, when using subsequently generated data stored on the local storage in the case where the CPS unit key corresponding to the subsequently generated data is pre-stored on the information recording medium, the decryption and reproduction of the subsequently generated data can be performed through the same processing sequence as the processing sequence for decrypting and reproducing the encrypted sub-content corresponding to the CPS unit stored on the information recording medium 100 as described above with reference to FIG. 9.

[(3.5) Processing Sequence for Acquiring, Recording, and Using Subsequently Generated Data]

In the foregoing, the processing sequence for each binding type has been described. However, in actuality, an information processor sequentially acquires subsequently generated data of various binding types as the subsequently generated data, and records them onto a local storage such as a hard disk or uses them. In this case, the information processor is to identify the binding type and perform processing in accordance with the identified binding type.

Figure 19:
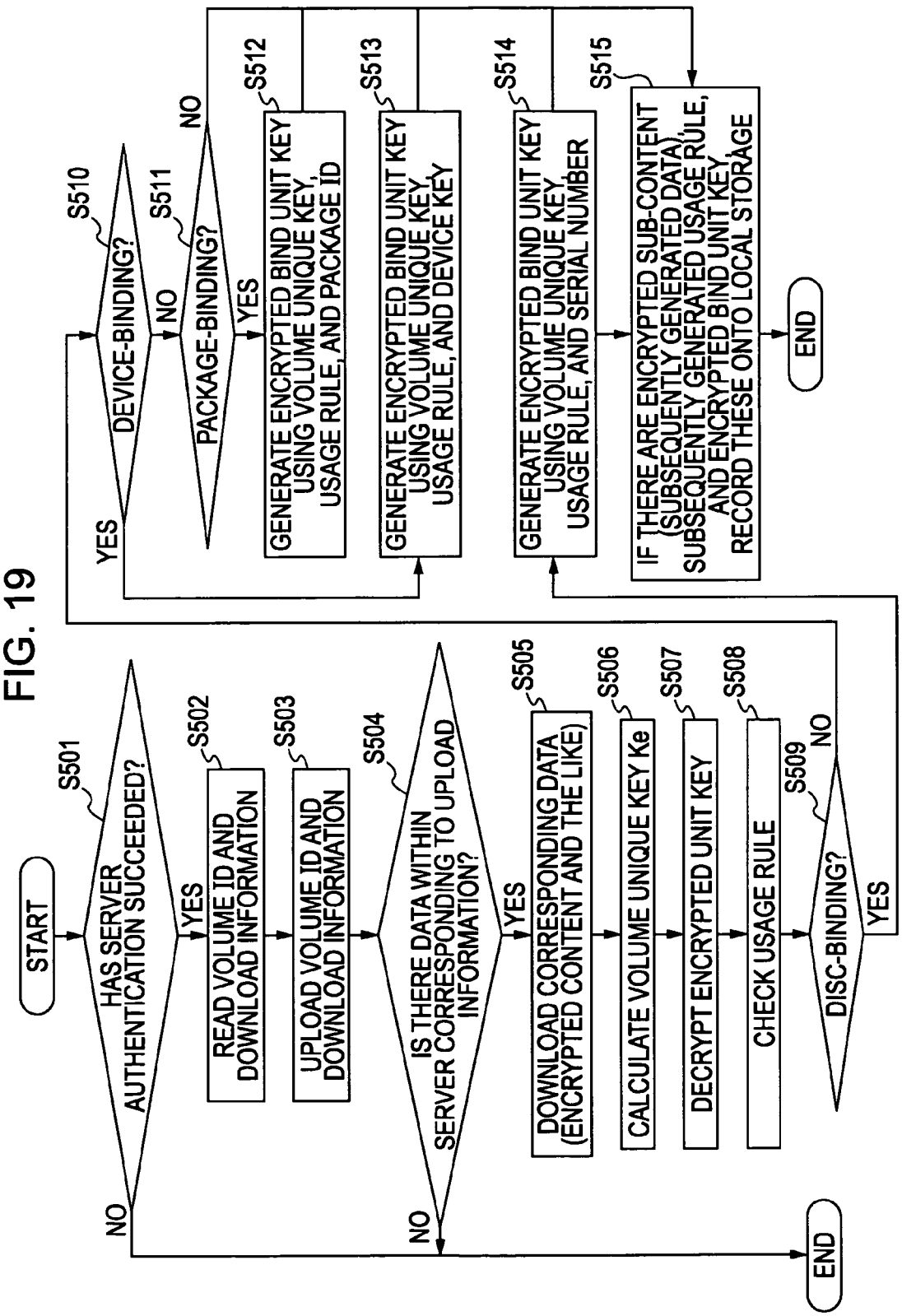
FIG. 19 is a diagram showing a flowchart illustrating the processing sequence for acquiring and recording subsequently generated data.
Figure 20:
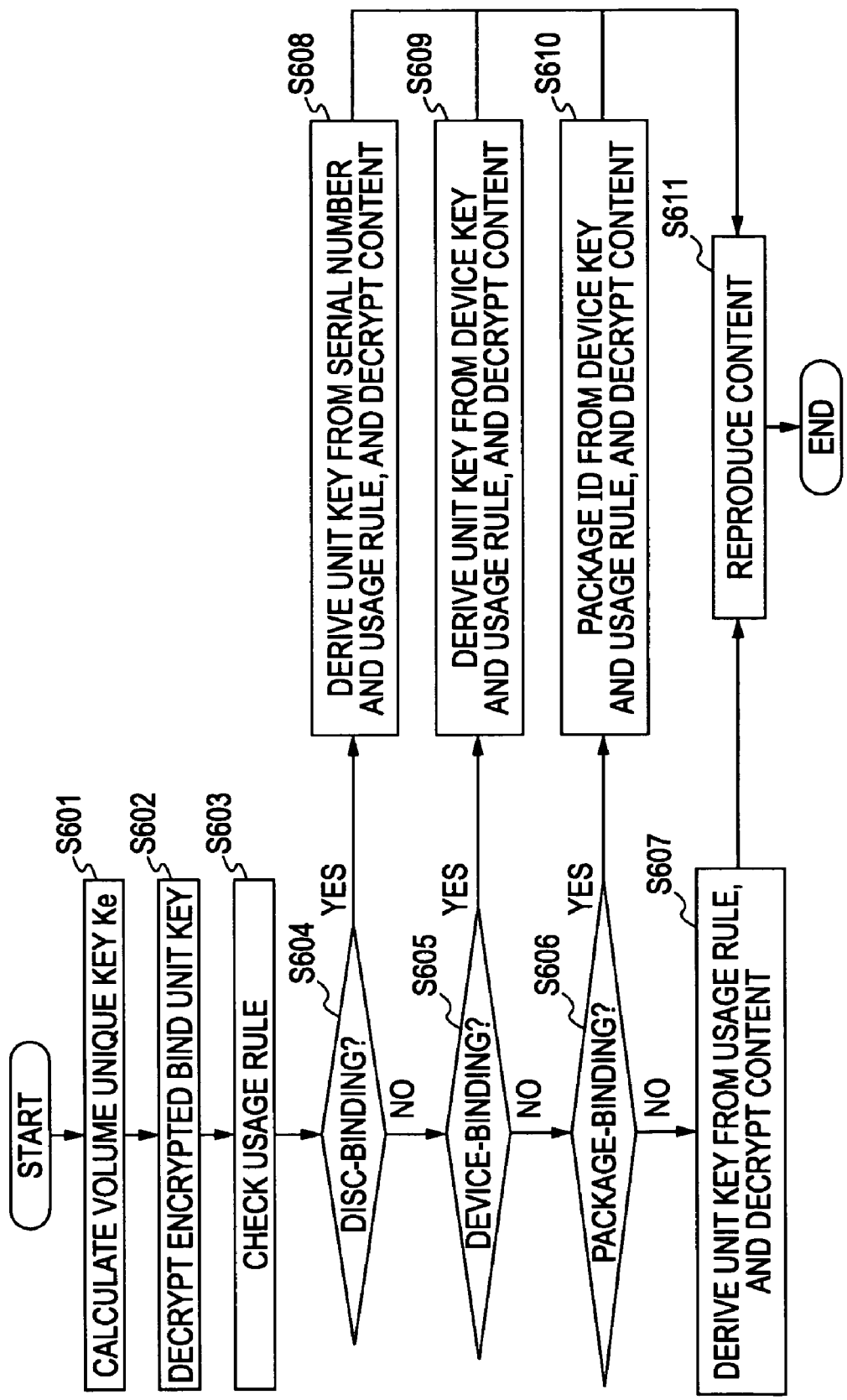
FIG. 20 is a diagram showing a flowchart illustrating the processing sequence for reproducing subsequently generated data.

Referring to the flow charts of FIGS. 19 and 20, description will be given of the processing sequence for identifying the binding type, acquiring and recording subsequently generated data in accordance with the identification result, and using the subsequently generated data stored on the local storage, which is executed in the information processor.

First, referring to the flowchart of FIG. 19, the processing sequence for acquiring and recording subsequently generated data will be described. Note that this processing is executed by an information processor having loaded in its drive the information recording medium storing the content managed while being sectioned into CPS units, that is, the recording medium described above with reference to FIG. 1 on which various kinds of data, such as the encrypted content 111 and the MKB 112, are recorded.

First, the information processor executes mutual authentication processing with the server that provides subsequently generated data. For example, authentication according to a public key encryption system, authentication using a password, or the like is employed as the authentication mode. When authentication does not succeed, the subsequent processing is interrupted. When authentication succeeds, the processing advances to step S502, where the information processor reads volume ID and download information from the loaded information recording medium, and transmits (uploads) these information to the server in step S503. The server searches for subsequently generated data set in correspondence with these volume ID and download information. When there is no corresponding subsequently generated data, the server transmits a message indicating the absence of the corresponding data to the information processor. When the information processor receives this message (step S504: No), the information processor interrupts the processing.

When there is corresponding subsequently generated data within the server, in step S505, the information processor receives (downloads) the corresponding subsequently generated data. Note that the received data basically includes encrypted sub-content, CPS unit key file, and usage rules (UR) as the subsequently generated data. However, when the information processor is to receive subsequently generated data to which a CPS unit key stored on the information recording medium is applicable, there may be cases where only the encrypted sub-content is sent.

Upon receiving the data from the server, in step S506, the information processor calculates the volume unique key [Ke]. As described above with reference to FIG. 9 and the like, the volume unique key is generated through key generation processing based on the media key [Km], which is acquired from the MKB by using the device key stored in the memory of the information processor, and the volume ID acquired from the information recording medium.

Next, in step S507, an encrypted unit key as the constituent data of the CPS unit key file received from the server, that is, for example:

CPS unit key file [Enc(Ke, f(Ku_n+1, UR#n+1))]

is decrypted with the volume unique key [Ke].

Further, in step S508, by referencing the usage rules (UR) acquired from the server, the binding type of the subsequently generated data is checked. If the binding type of the subsequently generated data is disc-binding (step S509: Yes), the processing of step S514 is executed. If the binding type of the subsequently generated data is device-binding (step S510: Yes), the processing of step S513 is executed. If the binding type of the subsequently generated data is package-binding (step S511: Yes), the processing of step S512 is executed.

Step S512 is a processing step for generating an encrypted bind unit key corresponding to package-bound subsequently generated data. As described above with reference to FIGS. 14 and 15, this processing generates an encrypted bind unit key containing the package ID [PID], for example:

Encrypted bind unit key [Enc(Ke, f(Ku_n+1, UR#n+1, PID))].

Step S513 is a processing step for generating an encrypted bind unit key corresponding to device-bound subsequently generated data. As described above with reference to FIGS. 6 and 7, this processing generates an encrypted bind unit key containing the device key [Kd], for example:

Encrypted bind unit key [Enc(Ke, f(Ku_n+1, UR#n+1, Kd))].

Step S514 is a processing step for generating an encrypted bind unit key corresponding to disc-bound subsequently generated data. As described above with reference to FIGS. 11 and 12, this processing generates an encrypted bind unit key containing the disc serial number [SN], for example:

Encrypted bind unit key [Enc(Ke, f(Ku_n+1, UR#n+1, SN))].

When the binding type corresponds to none of the above, the generation of a bind unit key is not executed. For example, this corresponds to the case of processing where, as described above with reference to FIG. 17, the CPS unit key corresponding to the subsequently generated data is pre-stored on the information recording medium.

When the generation of a bind unit key is unnecessary, or after any one of the processing of steps S512 to S514 has been executed, the processing advances to step S515 where the generated encrypted bind unit key, the encrypted sub-content as the subsequently generated data from the server, and the usage rules are recorded onto the local storage, and the processing ends.

Next, the processing for using subsequently generated data recorded on the local storage will be described with reference to FIG. 20. Note that this processing is also executed by an information processor having loaded in its drive the information recording medium storing the content managed while being sectioned into CPS units, that is, the recording medium described above with reference to FIG. 1 on which various kinds of data, such as the encrypted content 111 and the MKB 112, are recorded.

First, in step S601, the information processor calculates the volume unique key [Ke]. As described above with reference to FIG. 10 and the other drawings, the volume unique key is generated by key generation processing based on the media key [Km], which is acquired from the MKB by using the device key stored in the memory of the information processor, and the volume ID acquired from the information recording medium.

Next, in step S602, the decryption of the encrypted bind unit key recorded on the local storage is executed with the generated volume key [Ke]. The encrypted bind unit key is one of disk-bound, device-bound, and package-bound, that is, one of the following encrypted bind unit keys:

Encrypted bind unit key [Enc(Ke, f(Ku_n+1, UR#n+1, SN))];

Encrypted bind unit key [Enc(Ke, f(Ku_n+1, UR#n+1, Kd))]; and

Encrypted bind unit key [Enc(Ke, f(Ku_n+1, UR#n+1, PID))].

Next, in step S603, by referencing the usage rules (UR) acquired from the server, the binding type of the subsequently generated data that is to be used is checked. Note that as described above with reference to FIG. 5Bc, in the configuration in which the binding type of each subsequently generated data in the local storage is recorded in the subsequently generated data search information set as the recording file in the local storage, the binding type of the subsequently generated data that is to be used can be checked by referencing the subsequently generated data search information.

If the binding type of the subsequently generated data is disc-binding (step S604: Yes), the processing of step S608 is executed. If the binding type of the subsequently generated data is device-binding (step S605: Yes), the processing of step S609 is executed. If the binding type of the subsequently generated data is package-binding (step S606: Yes), the processing of step S610 is executed.

Step S608 is a processing step for generating a unit key through decryption of an encrypted bind unit key corresponding to disc-bound subsequently generated data. In this processing, as described above with reference to FIG. 13, after decrypting, for example:

Encrypted bind unit key [Enc(Ke, f(Ku_n+1, UR#n+1, SN))], using the volume unique key [Ke], the unit key [Ku_n+1] is calculated by unbinding processing through computation based on the usage rules [UR#n+1] acquired from the server, and the serial number [SN] read from the information recording medium, and then the encrypted sub-content Enc(Ku_n+1, CPS_Unit#n+1) as the subsequently generated data acquired from the server and recorded on the local storage is decrypted.

Step S609 is a processing step for generating a unit key through decryption of an encrypted bind unit key corresponding to device-bound subsequently generated data. In this processing, as described above with reference to FIG. 9, after decrypting, for example:

Encrypted bind unit key [Enc(Ke, f(Ku_n+1, UR#n+1, Kd))], using the volume unique key [Ke], the unit key [Ku_n+1] is calculated by unbinding processing through computation based on the usage rules [UR#n+1] acquired from the server, and the device key [Kd] acquired from the memory of the information processor, and then the encrypted sub-content Enc(Ku_n+1, CPS_Unit#n+1) as the subsequently generated data acquired from the server and recorded on the local storage is decrypted.

Step S610 is a processing step for generating a unit key through decryption of an encrypted bind unit key corresponding to package-bound subsequently generated data. In this processing, as described above with reference to FIG. 13, after decrypting, for example:

Encrypted bind unit key [Enc(Ke, f(Ku_n+1, UR#n+1, PID))], using the volume unique key [Ke], the unit key [Ku_n+1] is calculated by unbinding processing through computation based on the usage rules [UR#n+1] acquired from the server, and the package ID [PID] read from the information recording medium, and then the encrypted sub-content Enc(Ku_n+1, CPU_Unit#n+1) as the subsequently generated data acquired from the server and recorded on the local storage is decrypted.

After any one of the above-described processing steps, the content is reproduced in step S611. Note that when the subsequently generated data corresponds to none of the above binding types, reproduction can be performed by performing decryption processing with the CPS unit key stored on the information recording medium.

While in the above-described embodiment the subsequently generated data is acquired from the server, the same processing can be performed also in the case where subsequently generated data is acquired via a storage medium other than the server, for example, a DVD. Further, subsequently generated data generated by the information processor can be also recorded onto the local storage for use through the same processing.

[4. Configuration Example of the Information Processor]

Next, referring to FIG. 21, an example of the configuration of the information processor that performs the above-described recording and reproduction processing for the content will be described.

Figure 21:
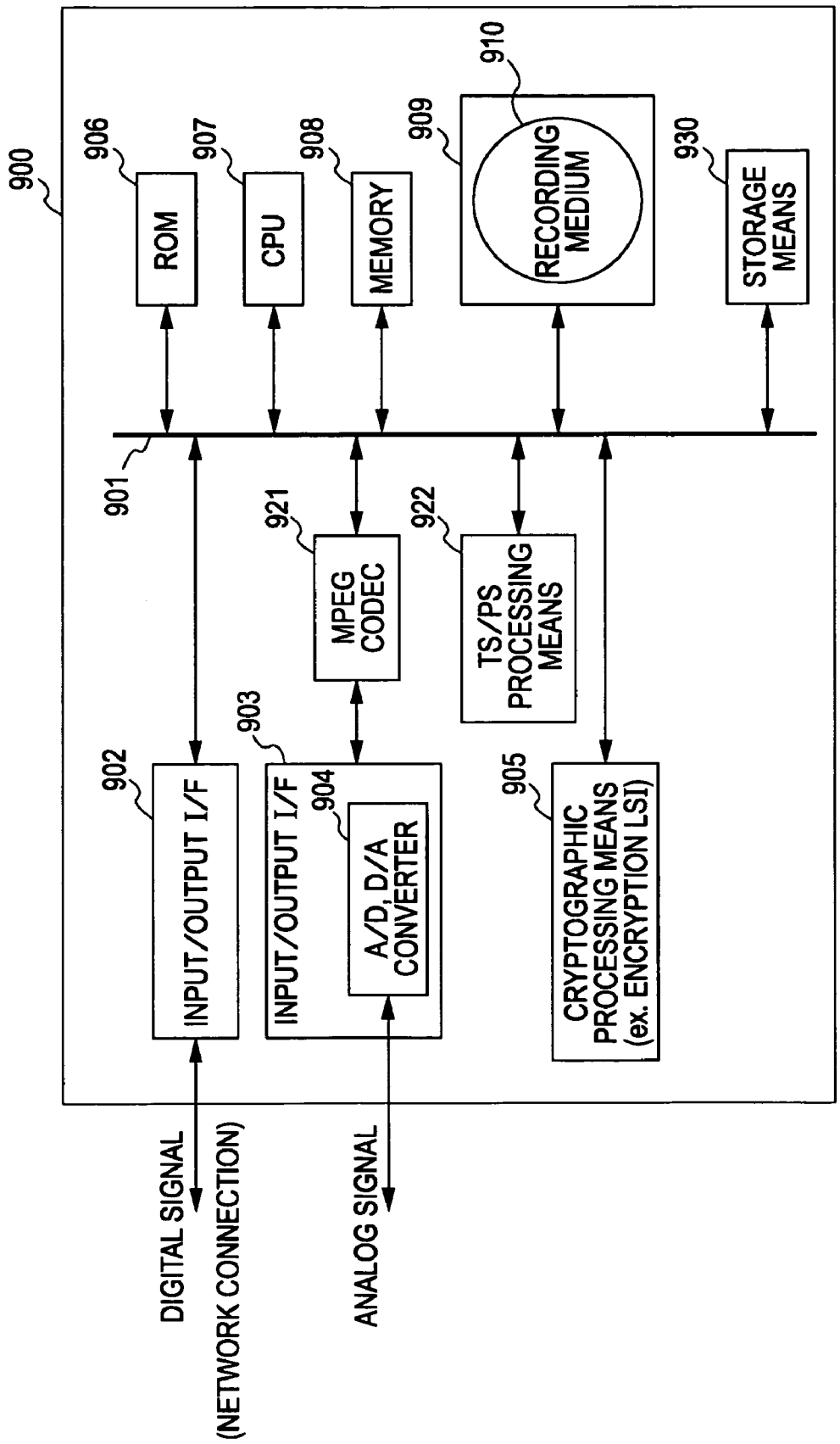
FIG. 21 is a diagram illustrating an example of the configuration of the information processor into which the information recording medium is loaded to thereby execute reproduction or recording processing.

An information processor 900 shown in FIG. 21 has a drive 909 for driving an information recording medium 910 to perform inputting/outputting of data recording and reproducing signals, a CPU 907 as control means for executing data processing in accordance with various programs, an ROM 906 as a storage area for programs, parameters, and the like, a memory 908, an input/output I/F 902 for inputting/outputting a digital signal, an input/output I/F 903 for inputting/outputting an analog signal, the input/output I/F 903 having an A/D, D/A converter 904, an MPEG codec 921 for executing the encoding/decoding processing of MPEG data, TS/PS processing means 922 for executing TS (Transport Stream)/PS (Program Stream) processing, cryptographic processing means 905 for executing various kinds of encryption processing, and storage means 930 as a local storage such as a hard disk. Respective blocks are connected to a bus 901.

When the information processor 900 is to perform reproduction of AV stream data including MPEG-TS data from the information recording medium 910, data read into the drive 909 from the information recording medium 910 is decrypted as required by the cryptographic processing means 905, and divided into respective data such as Video, Audio, and subtitle by the TS/PS processing means 922.

Further, the digital data decrypted by the MPEG codec 921 is converted into an analog signal by the D/A converter 904 in the input/output I/F 902 and output. Further, when performing digital output, the MPEG-TS data decrypted by the cryptographic processing means 905 is output as digital data through the input/output I/F 902. The output in this case is made to a digital interface such as IEEE 1394, Ethernet cable, wireless LAN, or the like. Note that when supporting a network connection function, the input/output I/F 902 is equipped with a function for network connection.

Further, in the case where data is output after undergoing conversion in the information processor 900 into a format allowing its reception by an output destination device, rate conversion processing and codec conversion processing are temporarily applied by the MPEG codec 921 on the respective data of Video, Audio, subtitle, and the like split by the TS processing means 922, and then data multiplexed into MPEG-TS or MPEG-PS again by the TS/PS processing means 922 is output from the digital input/output I/F 902. Alternatively, under the control of the CPU 907, conversion into a codec other than MPEG or multiplexed file is performed for output from the digital input/output I/F 902.

Management data such as usage rules as CPS unit management data is saved into the memory 908 after being read from the information recording medium 910. Key information for each COS unit, which becomes necessary when performing reproduction, can be acquired from the data saved in the memory.

Data of the subsequently generated data, such as data generated or acquired by the information processor 900, is recorded on the storage means 930 such as a hard disk. A virtual file system is built by merging application, and reproduction processing is executed together with the content read from the recording medium.

Next, description will be given of the operation for recording the data of subsequently generated data such as data generated or acquired by the information processor 900. As for the data to be recorded, two cases are conceived, that is, a case where a digital signal is input, and a case where an analog signal is input. In the case of a digital signal, the digital signal is input from the digital signal input/output I/F 902, and data on which appropriate encryption processing is performed by the cryptographic processing means 905 as required is stored onto the recording medium 910 or the storage means 930.

Subsequently generated data generated or acquired by the information processor 900 or the like is recorded on the storage means 930 such as a hard disk. The encrypted bind unit key, usage rules, and the like are further recorded on the storage means 930.

When the input digital signal is to be stored after converting the data format thereof, the input digital signal is converted into a data format for storage by the MPEG codec 921, the CPUS 907, and the TS/PS processing means 922. Thereafter, the resultant data is subjected to appropriate encryption processing by the cryptographic processing means 905 and stored onto the recording medium 910. In the case of an analog signal, the analog signal input to the input/output I/F 903 is converted into a digital signal by the A/D converter 904, and converted by the MPEG codex 921 into a codec used at the time of recording.

Thereafter, the resultant data is converted into AV multiplex data as the recording data format by the TS/PS processing means, and data on which appropriate encryption processing is performed by the cryptographic processing means 905 as required is stored onto the recording medium 910.

When information required by the information processor 900 is to be acquired via a network external to the information processor, the acquired data is temporarily stored into the memory 908 in the information processor 900. Examples of the data to be stored include key information necessary for the reproduction of content, subtitles to be reproduced simultaneously with the reproduction of content, data such as Audio or still pictures, and content management information.

Data subsequently generated or acquired is temporarily saved into the memory 908, and stored onto the storage means 930 such as a hard disk through selection by the user or in accordance with a predetermined control sequence.

Note that the program for executing reproduction or recording processing is stored in the ROM 906. While the program is being executed, the memory 908 is used as the storage and working area for parameters and data. While FIG. 21 shows a device configuration enabling data recording and reproduction, a device with only a reproduction function or a device with only a recording function can be also configured. The present invention is applicable to these kinds of device as well.

The present invention has been described above in detail by way of specific embodiments thereof. However, it is obvious that various alterations or substitutes to the embodiments can be made by those skilled in the art without departing from the scope of the present invention. That is, the present invention has been disclosed only by way of example and hence should not be construed restrictively. The scope of the present invention should be determined by the appended claims.

For example, while in the embodiment the device-binding (FIGS. 6 and 7), disc-binding (FIGS. 12 and 13), and package-binding (FIGS. 14 and 15) types are described separately, the device-binding and disc-binding types may be combined with each other into a device/disc-binding type or, further, a device/package-binding type may be employed. That is, when the binding type is device/disc-binding, in particular, reproduction can be performed only by using the combination of the disc used for the acquisition of subsequently generated data and the device used for the acquisition of the subsequently generated data. Therefore, even when subsequently generated data stored on the device is copied onto another reproducing device, reproduction of the data cannot be performed since the information (which is the device key in the embodiment) stored on the device and used for the binding is different, thereby enabling more strict reproduction management. Note that in this case, using the reserved area, the above-descried device/disc-binding and device/package-binding may be added to the binding types shown in FIG. 5A. Note that in the binding processing in step S124 shown in FIG. 7 and in step S214 shown in FIG. 21, the device/disc-binding can be realized by performing an exclusive OR operation using the device key and the serial number, and the device/package-binding can be realized by performing an exclusive OR operation using the device key and the package ID number.

Note that the series of processing described in this specification can be executed by a hardware or software, or a composite structure of the two. The processing by the software can be executed by installing a program, in which the processing sequence is recorded, into the memory in a computer incorporated into dedicated hardware and executing the program, or by installing the program onto a general-purpose computer capable of executing various processing and causing the computer to execute the program.

For example, the program can be previously recorded onto a hard disk or ROM (Read Only Memory) as a recording medium. Alternatively, the program can be temporarily or permanently stored (recorded) on a removable recording medium such as a flexible disc, a CD-ROM (Compact Disc Read Only Memory), an MO (Magneto optical) disc, a DVD (Digital Versatile Disc), a magnetic disc, or a semiconductor memory. Such a removable recording medium can be provided in the form of so-called packaged software.

Note that other than being installed onto a computer from the removable recording medium as described above, the program can be wireless-transferred to the computer from a download site or can be wire-transferred to the computer via a network such as the LAN (Local Area Network) or Ethernet; the program thus transferred can be received by the computer to be installed into a built-in recording medium such as a hard disk.

Note that the various kinds of processing described in this specification may be executed not only in time series in the described order but may also be executed in parallel or individually as required depending on the throughput of the device executing the processing. Further, the term "system" as used in this specification refers to a logical assembly structure of a plurality of devices, and devices of each structure are not necessarily present within the same casing.

As described above, according to the embodiment of the present invention, when recording subsequently generated data, such as information subsequently generated or downloaded by the user using the information stored on the information recording medium, onto the local storage such as a hard disk or a removable medium, the unit key as the encryption key for the subsequently generated data is generated as data bound to the key information acquired from the information processor or the identification information acquired from the information recording medium, and is recoded in an encrypted form. Thus, unbinding processing is required to use the subsequently generated data recorded on the local storage. The unbinding processing requires the following conditions. That is, in the case of, for example, device-binding type subsequently generated data, it is required that the information processor that is to use the subsequently generated data be the same information processor that has executed the recording; in the case of, for example, disc-binding type subsequently generated data, it is required that the same disc as that used when recording the subsequently generated data be loaded in the information processor; and in the case of, for example, package-binding type subsequently generated data, it is required that the information processor be loaded with a disc having the same package ID as that of the disc used when recording the subsequently generated data. Therefore, usage restrictions for subsequently generated data can be realized in various ways.

What is claimed is:

1. An information processor, comprising:
a data processing section including a processor that executes computer readable instructions for performing a process of storing subsequently generated data, which is subsequently generated or acquired using information read from an information recording medium, onto a storage device, said subsequently generated data being generated subsequent to data being pre-stored on the information recording medium,
wherein the data processing section is configured to execute a processing of storing onto the storage device encrypted subsequently generated data as encrypted data that is encrypted with a unit key as an encryption key corresponding to a content management unit to which the subsequently generated data belongs, and execute a processing of acquiring an encrypted bind unit key and storing the encrypted bind unit key onto the storage device, the encrypted bind unit key being encrypted data of a bind unit key including as its constituent data the unit key and one of key information acquired from the information processor and identification information acquired from the information recording medium, said bind unit key being one of a plurality of different binding types uniquely identified by respective codes stored in the storage device for device-binding, disc serial-binding, package-binding, and unbound.

2. The information processor according to claim 1, wherein the data processing section is configured to execute a processing of acquiring an encrypted bind unit key and storing the encrypted bind unit key onto the storage means, the encrypted bind unit key including in the bind unit key usage rules corresponding to the content management unit to which the subsequently generated data belongs.

3. The information processor according to claim 2, wherein:

the information recording medium is an optical disc; and the usage rules corresponding to the content management unit to which the subsequently generated data belongs include binding type information indicating one of the following:

whether the encrypted bind unit key is encrypted while being associated with the information processor;

whether the encrypted bind unit key is encrypted into one of an ID corresponding to content recorded on the optical disc and ID information set for each stamper used when manufacturing the optical disc, while being associated with the information recording medium; and whether the encrypted bind unit key is encrypted while being associated with a serial number given to the optical disc.

4. The information processor according to claim 1, wherein the data processing section is configured to generate a device key unique to the information processor and stored in the information processor, and an encrypted bind unit key as encrypted data of a bind unit key including the unit key as its constituent data.

5. The information processor according to claim 1, wherein the data processing section is configured to generate identification information unique to the information recording medium and stored on the information recording medium, and an encrypted bind unit key as encrypted data of a bind unit key including the unit key as its constituent data.

6. The information processor according to claim 1, wherein the data processing section is configured to generate identification information stored on the information recording medium and unique to an assembly of a predetermined number of information recording media, and an encrypted bind unit key as encrypted data of a bind unit key including the unit key as its constituent data.

7. The information processor according to claim 1, wherein the data processing section is configured to generate a bind unit key by computation processing based on the unit key and one of key information acquired from the information processor and identification information acquired from the information recording medium.

8. The information processor according to claim 1, wherein the information processor is configured to store subsequently generated data acquired from a subsequently generated data providing server onto the storage means, and acquire the encrypted bind unit key by decrypting an encrypted unit key corresponding to acquired subsequently generated data acquired from one of the subsequently generated data providing server and a server different from the subsequently generated data providing server.

9. An information processing method, comprising:

a data processing step of executing with a processor a processing of storing subsequently generated data, which is subsequently generated or acquired using information read from an information recording medium, onto a storage device, said subsequently generated data being generated subsequent to data being pre-stored on the information recording medium, wherein the data processing step includes:

a step of storing onto the storage device encrypted subsequently generated data as encrypted data that is encrypted with a unit key as an encryption key corresponding to a content management unit to which the subsequently generated data belongs;

an encrypted bind unit key acquiring step of acquiring an encrypted bind unit key, the encrypted bind unit key being encrypted data of a bind unit key including as its constituent data the unit key and one of key information acquired from an information processor and identification information acquired from the information recording medium; and a step of executing a processing of storing the encrypted bind unit key onto the storage means, said bind unit key being one of a plurality of different binding types uniquely identified by respective codes stored in the storage device for device-binding, disc serial-binding, package-binding, and unbound.

10. A non-transitory computer storage medium having instructions that when executed on a computer perform steps comprising:

a data processing step of executing with a processor a processing of storing subsequently generated data, which is subsequently generated or acquired using information read from an information recording medium, onto a storage device, said subsequently generated data being generated subsequent to data being pre-stored on the information recording medium;

wherein the data processing step includes:

a step of storing onto the storage device encrypted subsequently generated data as encrypted data that is encrypted with a unit key as an encryption key corresponding to a content management unit to which the subsequently generated data belongs;

an encrypted bind unit key acquiring step of acquiring an encrypted bind unit key, the encrypted bind unit key being encrypted data of a bind unit key including as its constituent data the unit key and one of key information acquired from an information processor and identification information acquired from the information recording medium; and a step of executing a processing of storing the encrypted bind unit key onto the storage means, said bind unit key being one of a plurality of different binding types uniquely identified by respective codes stored in the storage device for device-binding, disc serial-binding, package-binding, and unbound.

* * * * *